US012552913B2

(12) United States Patent
Pfaendner

(10) Patent No.: US 12,552,913 B2
(45) Date of Patent: Feb. 17, 2026

(54) USE OF PHENOLICALLY SUBSTITUTED SUGAR DERIVATIVES AS STABILISERS, PLASTIC COMPOSITION, METHOD FOR STABILISING PLASTICS AND PHENOLICALLY SUBSTITUTED SUGAR DERIVATIVES

(71) Applicant: FRAUNHOFER-GESELLSCHAFT ZUR FÖRDERUNG DER ANGEWANDTEN FORSCHUNG E. V., Munich (DE)

(72) Inventor: Rudolf Pfaendner, Darmstadt (DE)

(73) Assignee: Fraunhofer-Gesellschaft zur förderung der angewandten Forschung e.V., Munich (DE)

( * ) Notice: Subject to any disclaimer, the term of this patent is extended or adjusted under 35 U.S.C. 154(b) by 1079 days.

(21) Appl. No.: 17/625,387

(22) PCT Filed: Jul. 7, 2020

(86) PCT No.: PCT/EP2020/069153
§ 371 (c)(1),
(2) Date: Jan. 7, 2022

(87) PCT Pub. No.: WO2021/005075
PCT Pub. Date: Jan. 14, 2021

(65) Prior Publication Data
US 2022/0267568 A1  Aug. 25, 2022

(30) Foreign Application Priority Data
Jul. 8, 2019  (DE) .......... 10 2019 210 040

(51) Int. Cl.
C08K 5/103 (2006.01)
C08K 5/00 (2006.01)
C08K 5/134 (2006.01)
C08K 5/20 (2006.01)

(52) U.S. Cl.
CPC ............ C08K 5/1345 (2013.01); C08K 5/005 (2013.01); C08K 5/103 (2013.01); C08K 5/20 (2013.01)

(58) Field of Classification Search
None
See application file for complete search history.

(56) References Cited

U.S. PATENT DOCUMENTS

| 2,682,522 | A | 6/1954 | Coover et al. |
| 2,716,101 | A | 8/1955 | Coover, Jr. et al. |
| 2,891,915 | A | 6/1959 | McCormack et al. |
| 3,285,855 | A | 11/1966 | Dexter et al. |
| 3,326,852 | A | 6/1967 | Thomas |
| 3,442,854 | A | 5/1969 | Curtius et al. |
| 3,919,363 | A | 11/1975 | Ura et al. |
| 3,946,093 | A | 3/1976 | Koto et al. |
| 4,328,174 | A | 5/1982 | Schmidt et al. |
| 4,331,614 | A | 5/1982 | Schmidt et al. |
| 4,374,971 | A | 2/1983 | Schmidt et al. |
| 4,415,719 | A | 11/1983 | Schmidt et al. |
| 5,216,113 | A | 6/1993 | Schulz-Schlitte et al. |
| 5,334,692 | A | 8/1994 | Hess et al. |
| 6,288,210 | B1 | 9/2001 | Shobja et al. |
| 6,291,630 | B1 | 9/2001 | König et al. |
| 6,861,499 | B2 | 3/2005 | Vinciguerra et al. |
| 7,115,765 | B2 | 10/2006 | Sprenger et al. |
| 7,816,486 | B2 | 10/2010 | Freitag et al. |
| 8,058,329 | B2 | 11/2011 | Just et al. |
| 8,349,925 | B2 | 1/2013 | Butz |
| 8,853,307 | B2 | 10/2014 | Butz |
| 9,441,091 | B2 | 9/2016 | Haruna et al. |
| 9,951,207 | B2 | 4/2018 | Hoelzl et al. |
| 10,138,354 | B2 | 11/2018 | Groos et al. |
| 10,214,631 | B2 | 2/2019 | Pfaendner et al. |
| 10,259,931 | B2 | 4/2019 | Hoelzl et al. |
| 10,323,136 | B2 | 6/2019 | Pfaendner et al. |
| 10,364,340 | B2 | 7/2019 | Pfaendner et al. |
| 10,370,537 | B2 | 8/2019 | Pfaendner et al. |
| 10,450,442 | B2 | 10/2019 | Pfaendner et al. |
| 10,544,284 | B2 | 1/2020 | Pfaendner et al. |
| 10,781,296 | B2 | 9/2020 | Groos et al. |
| 10,913,743 | B2 | 2/2021 | Pfaendner et al. |
| 11,292,859 | B2 | 4/2022 | Klein et al. |
| 11,407,720 | B2 | 8/2022 | Fischer et al. |
| 11,591,450 | B2 | 2/2023 | Pfaendner et al. |

(Continued)

FOREIGN PATENT DOCUMENTS

| CN | 103554650 A | 2/2014 |
| CN | 105960432 A | 9/2016 |

(Continued)

OTHER PUBLICATIONS

US 11,358,941 B2, 06/2022, Klein et al. (withdrawn)
U.S. Appl. No. 17/906,080, filed Sep. 12, 2022.
U.S. Appl. No. 17/907,038, filed Sep. 22, 2022.
U.S. Appl. No. 17/995,978, filed Oct. 11, 2022.
U.S. Appl. No. 17/996,747, filed Oct. 20, 2022.
U.S. Appl. No. 18/245,065, filed Mar. 13, 2023.
U.S. Appl. No. 18/251,255, filed May 1, 2023.
State Intellectual Property Organization of the People's Republic of China, Third Office Action in Chinese Patent Application No. 202080062735.0 (May 21, 2024).

(Continued)

Primary Examiner — Tanisha Diggs
(74) Attorney, Agent, or Firm — Leydig, Voit & Mayer, Ltd.

(57) ABSTRACT

The present invention relates to the use of at least one phenolically substituted sugar derivative as a stabiliser of organic materials, in particular plastics, against oxidative, thermal and/or actinic degradation. The present invention also relates to a corresponding plastic composition, to a method for stabilising plastics, to a moulding compound or a moulded part as well as a phenolically substituted sugar derivative.

5 Claims, No Drawings

(56) References Cited

U.S. PATENT DOCUMENTS

| | | | |
|---|---|---|---|
| 11,634,560 B2 | 4/2023 | Ciesielski et al. | |
| 11,760,865 B2 | 9/2023 | Pfaendner et al. | |
| 2005/0020800 A1 | 1/2005 | Levchik et al. | |
| 2005/0176983 A1 | 8/2005 | Sprenger et al. | |
| 2007/0219295 A1 | 9/2007 | Levchik et al. | |
| 2008/0045673 A1 | 2/2008 | Piotrowski et al. | |
| 2008/0167405 A1 | 7/2008 | Just et al. | |
| 2010/0016244 A1 | 1/2010 | Vachy | |
| 2010/0280215 A1 | 11/2010 | Just et al. | |
| 2011/0136748 A1 | 6/2011 | Vachy | |
| 2011/0257310 A1 | 10/2011 | Butz | |
| 2011/0275747 A1* | 11/2011 | Hacker | C08K 5/3462 524/211 |
| 2012/0296018 A1 | 11/2012 | Haruna et al. | |
| 2014/0005289 A1 | 1/2014 | Butz | |
| 2014/0128520 A1 | 5/2014 | Haruna et al. | |
| 2016/0052927 A1 | 2/2016 | Pfaendner et al. | |
| 2016/0272789 A1 | 9/2016 | Pfaendner et al. | |
| 2017/0066905 A1 | 3/2017 | Hoelzl et al. | |
| 2017/0107375 A1 | 4/2017 | Pfaendner et al. | |
| 2017/0121499 A1 | 5/2017 | Pfaendner et al. | |
| 2017/0260362 A1 | 9/2017 | Pfaendner et al. | |
| 2017/0260363 A1 | 9/2017 | Pfaendner et al. | |
| 2017/0260366 A1 | 9/2017 | Pfaendner et al. | |
| 2017/0267835 A1 | 9/2017 | Groos et al. | |
| 2018/0186970 A1 | 7/2018 | Groos et al. | |
| 2018/0201760 A1 | 7/2018 | Hoelzl et al. | |
| 2019/0248927 A1 | 8/2019 | Klein et al. | |
| 2020/0231783 A1 | 7/2020 | Pfaendner et al. | |
| 2020/0317886 A1 | 10/2020 | Pfaendner et al. | |
| 2020/0361879 A1 | 11/2020 | Fischer et al. | |
| 2021/0130582 A1 | 5/2021 | Ciesielski et al. | |
| 2021/0388176 A1 | 12/2021 | Metzsch-Zilligen et al. | |
| 2022/0073734 A1 | 3/2022 | Polidar et al. | |
| 2022/0119624 A1 | 4/2022 | Pfaendner et al. | |
| 2022/0162422 A1 | 5/2022 | Pfaendner | |
| 2022/0267568 A1 | 8/2022 | Pfaendner | |
| 2022/0340717 A1 | 10/2022 | Olschewski et al. | |
| 2023/0117792 A1 | 4/2023 | Pfaendner et al. | |
| 2023/0119120 A1 | 4/2023 | Pfaendner et al. | |
| 2023/0174746 A1 | 6/2023 | Polidar et al. | |
| 2023/0203274 A1 | 6/2023 | Polidar et al. | |
| 2024/0026124 A1 | 1/2024 | Pfaendner | |
| 2024/0043745 A1 | 2/2024 | Mayer et al. | |
| 2024/0174840 A1 | 5/2024 | Pfaendner et al. | |

FOREIGN PATENT DOCUMENTS

| | | | | |
|---|---|---|---|---|
| CN | 108 409 930 A | | 3/2018 | |
| CN | 109206670 A | | 1/2019 | |
| CN | 111040396 A | * | 4/2020 | C08L 67/02 |
| CN | 111448250 A | | 7/2020 | |
| DE | 102007005863 A1 | | 8/2008 | |
| DE | 102007007644 A1 | | 8/2008 | |
| DE | 102017217312 A1 | | 3/2019 | |
| EP | 2 450 401 A1 | | 5/2012 | |
| GB | 1081789 A | | 8/1967 | |
| JP | S47-034336 A | | 11/1972 | |
| JP | S48-000939 A | | 1/1973 | |
| JP | S52-14648 A | | 2/1977 | |
| JP | S53-4086 B | | 2/1978 | |
| JP | S54-21378 B1 | | 7/1979 | |
| JP | 2000-192066 A | | 7/2000 | |
| JP | 2010-270310 A | | 12/2010 | |
| JP | 2011-530579 A | | 12/2011 | |
| RU | 2562258 C1 | * | 9/2015 | |
| WO | WO 03/070736 A1 | | 8/2003 | |
| WO | WO 2006/084488 A1 | | 8/2006 | |
| WO | WO 2006/084489 A1 | | 8/2006 | |
| WO | WO 2008/000920 A1 | | 1/2008 | |
| WO | WO 2008/101845 A1 | | 8/2008 | |
| WO | WO 2010/135398 A1 | | 11/2010 | |
| WO | WO 2011/000019 A1 | | 1/2011 | |
| WO | WO 2011/004739 A1 | | 1/2011 | |
| WO | WO 2013/020696 A2 | | 2/2013 | |
| WO | WO 2013/068437 A2 | | 5/2013 | |
| WO | WO 2013/072295 A1 | | 5/2013 | |
| WO | WO 2014/064064 A1 | | 5/2014 | |
| WO | WO 2019/063550 A1 | | 4/2019 | |

OTHER PUBLICATIONS

Croitoru et al., "Biocatalytic acylation of sugar alcohols by 3-(4-hydroxyphenyl)propionic acid," *Process Biotechnology* 47(12): 1894-1902 (2012).

"STN search report", from the Chemical Library, provided by Interbioscreen Ltd., Database Registry (Online), CAS Registration No. 371953-68-3 (2011).

China National Intellectual Property Administration, First Office Action in Chinese Patent Application No. 202080062735.0 (Jul. 5, 2023).

Database Registry (STN) [Online], CAS Registration Nos. 1809735-17-8, 371953-68-3 (2015).

Japan Patent Office, Notification of Reasons for Refusal in Japanese Patent Application No. 2022-501007 (Feb. 6, 2024).

State Intellectual Property Organization of the People's Republic of China, Second Office Action in Chinese Patent Application No. 202080062735.0 (Feb. 27, 2024).

Japan Patent Office, Decision of Refusal in Japanese Patent Application No. 2022-501007 (Oct. 29, 2024).

Aubert et al., "Azoalkanes—novel flame retardants and their structure-property relationship," *Polymers Advanced Technologies* 22: 1529-1538 (2011).

Aubert et al., "Azoalkanes: A Novel Class of Additives for Cross-Linking and Controlled Degradation of Polyolefins," *Macromol. Sci. Eng.* 292(6): 707-714 (2007).

Krönke et al., "Antioxidants," *Ullmann's Encyclopedia of Industrial Chemistry*, Viley/VCH, Weinheim (2015) 36 pgs.

Pawelec et al., "Triazene compounds as a novel and effective class of flame retardants for polypropylene," *Polymer Degradation and Stability* 97: 948-954 (2012).

German Patent Office, Office Action in German Patent Application No. 10 2019 210 040.6 (Sep. 16, 2019).

European Patent Office, International Search Report in International Application No. PCT/EP2020/069153 (Sep. 22, 2020).

European Patent Office, Written Opinion in International Application No. PCT/EP2020/069153 (Sep. 22, 2020).

International Bureau WIPO, International Preliminary Report on Patentability in International Application No. PCT/EP2020/069153 (Jan. 11, 2022).

U.S. Appl. No. 14/442,606, filed May 13, 2015.
U.S. Appl. No. 14/779,849, filed Sep. 24, 2015.
U.S. Appl. No. 15/311,674, filed Nov. 16, 2016.
U.S. Appl. No. 15/317,899, filed Dec. 9, 2016.
U.S. Appl. No. 15/511,410, filed Mar. 15, 2017.
U.S. Appl. No. 15/511,471, filed Mar. 15, 2017.
U.S. Appl. No. 15/511,445, filed Mar. 15, 2017.
U.S. Appl. No. 15/529,026, filed May 23, 2017.
U.S. Appl. No. 15/738,515, filed Dec. 20, 2017.
U.S. Appl. No. 16/344,830, filed Apr. 25, 2019.
U.S. Appl. No. 16/488,902, filed Aug. 26, 2019.
U.S. Appl. No. 16/633,645, filed Jan. 24, 2020.
U.S. Appl. No. 16/649,656, filed Mar. 22, 2020.
U.S. Appl. No. 16/764,291, filed May 14, 2020.
U.S. Appl. No. 17/287,079, filed Apr. 20, 2021.
U.S. Appl. No. 17/425,267, filed Jul. 22, 2021.
U.S. Appl. No. 17/423,800, filed Jul. 16, 2021.
U.S. Appl. No. 17/441,626, filed Sep. 21, 2021.
U.S. Appl. No. 17/640,174, filed Mar. 3, 2022.

Liu Xia et al., "Synthesis of Antioxidant Irganox 121" *Journal of Beijing Institute of Petro-Chemicals Technology* 10(3): 32-34 (2002).

* cited by examiner

USE OF PHENOLICALLY SUBSTITUTED SUGAR DERIVATIVES AS STABILISERS, PLASTIC COMPOSITION, METHOD FOR STABILISING PLASTICS AND PHENOLICALLY SUBSTITUTED SUGAR DERIVATIVES

CROSS-REFERENCE TO RELATED APPLICATIONS

This patent application is the U.S. national phase of International Application No. PCT/EP2020/069153, filed on Jul. 7, 2020, which claims the benefit of German Patent Application No. 10 2019 210 040.6, filed Jul. 8, 2019, the disclosures of which are incorporated herein by reference in their entireties for all purposes.

The present invention relates to the use of at least one phenolically substituted sugar derivative as a stabilizer of organic materials, in particular of plastic materials, against oxidative, thermal and/or actinic degradation. In addition, the present invention relates to a corresponding plastic composition, a method for stabilizing plastic materials, a molding compound or a molded part and a phenolically substituted sugar derivative.

Organic materials, such as plastic materials, are subject to aging processes which ultimately lead to a loss of the desired properties, such as the mechanical properties. This process, referred to as autoxidation, starting from radical chain cleavage by mechanochemical processes or by UV radiation in the presence of oxygen, leads to changes in the polymer chain, for example with regard to the molecular weight or the formation of new chemical groups. Stabilizers are therefore used in order to prevent or at least delay this aging. Important representatives of stabilizers are antioxidants, which interfere with the radicals formed during the autoxidation and thus interrupt the degradation process. A distinction is made generally between primary antioxidants, which are able to react directly with oxygen-containing free radicals or C radicals, and secondary antioxidants, which react with hydroperoxides formed as intermediates (see C. Kröhnke et al. Antioxidants in Ullmann's encyclopedia of industrial chemistry, Wiley-VCH Verlag, Weinheim 2015). Typical representatives of primary antioxidants are, for example, phenolic antioxidants, amines, and also lactones. Classes of secondary antioxidants are phosphorus compounds such as phosphites and phosphonites, but also organosulfur compounds such as sulfides and disulfides. Primary and secondary antioxidants are usually frequently combined in practice, which leads to a synergistic effect.

Since some of the stabilizers used today can also have disadvantages (for example, hydrolytic stability of phosphites and release of phenol, odor from sulfur-containing stabilizers, discoloration of amines, etc.), new stabilizer solutions are still being sought. Phenolic antioxidants generally consist of sterically hindered phenol groups, which are present in the form of esters to increase molecular weight, improve compatibility and reduce volatility. To increase the effectiveness and a high concentration of phenol groups with a simultaneously low concentration of ineffective components of a molecule, polyols such as pentaerythritol were used, the 4 alcohol groups of which are completely esterified. Pentaerythritol tetrakis(3-(3,5-di-tert-butyl-4-hydroxyphenyl)propionate, for example, available under the trade name Irganox™ 1010, has become one of the most important standard stabilizers. Substitution products containing a higher number of phenolic antioxidants, such as hexasubstituted mannitol or hexasubstituted cyclitol, are also known in principle. All these structures have in common that, for the reasons stated, complete esterification is achieved with the effective structures.

As already mentioned, phenolic antioxidants are usually combined in a synergistic manner with other stabilizers. In exceptional cases, however, stabilizers are also known which have both primary and secondary antioxidant structures in one molecule, such as

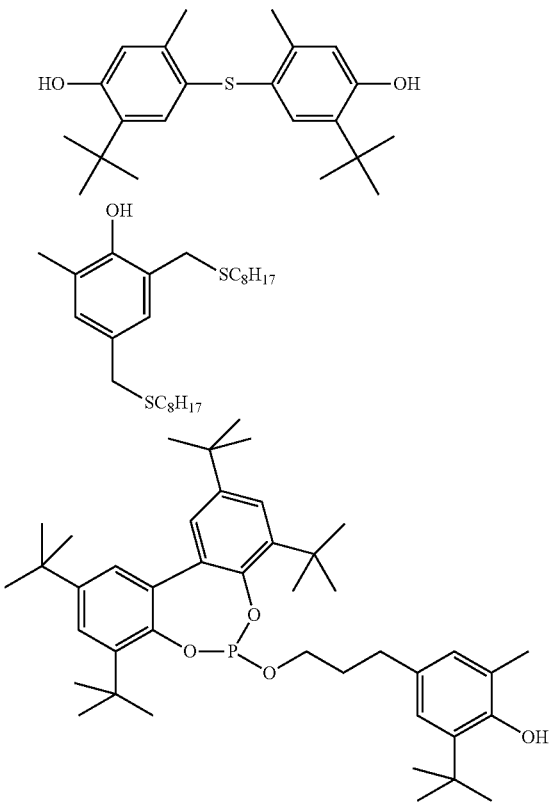

In a separate application (WO 2019063550), it was found that combinations of alditols or cyclitols with primary or secondary antioxidants are particularly suitable for stabilizing recycled plastic materials. Here, too, it is advantageous according to the invention to use mixtures of different stabilizers.

The object of the present invention is therefore to provide stabilizers based on, at least in part, renewable raw materials which show a high stabilizing effect.

The object is achieved by the stabilized plastic composition described herein, by the method for stabilizing plastic materials described herein, by the molding compound and the stabilizer composition for stabilizing plastic materials described herein, as well as the stabilizing sugar derivatives described herein. Advantageous developments thereof are also described.

The present invention thus relates to the use of at least one phenolically substituted sugar derivative, the sugar derivative having a body derived from a sugar, and at least one substituent according to general formula I Formula I

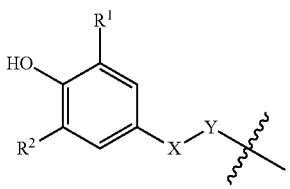

where $R^1$ and $R^2$ are identical or different on each occurrence and are selected from the group consisting of hydrogen and linear or branched alkyl radicals, with the proviso that at least one residue $R^1$ or $R^2$ is not hydrogen, X an alkylene group having 1 to 18 carbon atoms or a chemical bond, Y a grouping selected from the group consisting of the following groupings

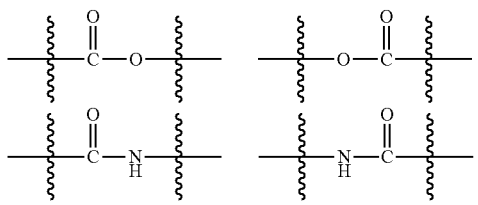

where the grouping X is bound to the terminus shown on the left of the groupings Y shown above, and where the body of the phenolically substituted sugar derivative derived from a sugar has at least 3 unsubstituted hydroxyl groups and/or the body of the phenolic substituted sugar derivative derived from a sugar has at least 4 carbon atoms and at least 2, preferably at least 3 unsubstituted hydroxyl groups, as a stabilizer of organic materials, in particular plastic materials, against oxidative, thermal and/or actinic degradation.

"Stabilizer" or "stabilizing" in the context of the present invention is understood that the appropriately provided organic materials, for example, which are mixed with a sugar derivative according to formula I, under oxidative, thermal and/or actinic conditions, have a longer durability, such as retention of mechanical and/or visual properties, compared with molding compounds that are provided without the corresponding additives. Surprisingly, it was found according to the invention that the stabilizing effect, as defined above, can be achieved with substances which have a basic structure based on renewable raw materials.

In particular, the body derived from a sugar is a monosaccharide, an oligosaccharide or a polysaccharide having at least 4 carbons.

The phenolic substituted sugar derivative particularly preferably comprises a maximum of 10, preferably a maximum of 5, more preferably a maximum of 3, particularly preferably 1 or 2 substituents according to formula I.

In particular, the body derived from a sugar can be at least one alditol, a cyclitol, a sugar acid or an amino sugar having at least 4 carbons.

For example, the alditol can have the following empirical formulas

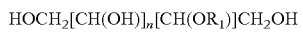

where n=2-6, preferably n=3-5, where $R_1$ is an optionally substituted sugar residue.

The at least one alditol is particularly preferably selected from the group consisting of threitol, erythritol, galactitol, mannitol, ribitol, sorbitol, xylitol, arabitol, isomalt, lactitol, maltitol, maltotritol and hydrogenated oligo- and polysaccharides with polyol end groups and mixtures hereof, wherein the at least one alditol is preferably selected from the group consisting of erythritol, mannitol, isomalt, maltitol and mixtures hereof.

The at least one cyclitol can be selected from the group consisting of inositol (myo, scyllo-, D-chiro-, L-chiro-, muco-, neo-, allo-, epi- and cis-inositol), quercitol, viscumitol, bornesitol, conduritol, ononitol, pinitol, pinpollitol, ciceritol, quebrachitol, quinic acid, shikimic acid and valienol, wherein the at least one cyclitol preferably is myo-inositol.

Preferred sugar acids are, for example, aldonic acids, such as, in particular, allonic acid, altronic acid, gluconic acid, mannonic acid, gulonic acid, idonic acid, galactonic acid, talonic acid, ribonic acid, arabonic acid, xylonic acid, lyxonic acid, erythronic acid or threonic acid, or aldaric acids such as mucic acid or glucaric acid, and mixtures and combinations hereof.

In the event that an amino sugar forms the basic structure of the compound according to the invention according to formula I, the at least one amino sugar is, for example, a mono- or diamino sugar and particularly preferably selected from the group consisting of 1-amino-1-deoxy-alditols, such as 1-amino-1-deoxy-galactitol, 1-amino-1-deoxy-mannitol, 1-amino-1-deoxy-sorbitol, 1-amino-1-deoxy-maltitol or α,ω-diamino-α,ω-dideoxyalditols such as 1,6-diamino-1,6-dideoxy sorbitol.

The residues $R^1$ and $R^2$ are identical or different, particularly preferably identical. The residues $R^1$ and $R^2$ can in particular be selected from the group consisting of tert-butyl and methyl.

Particularly preferred phenolic substituted sugar derivatives are selected from the group consisting of the following molecules

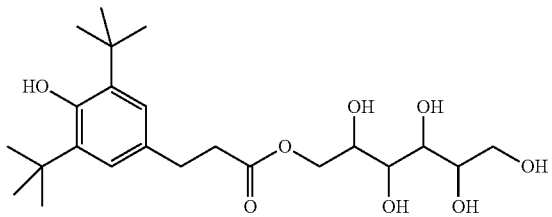

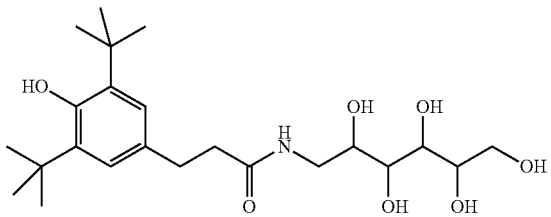

-continued

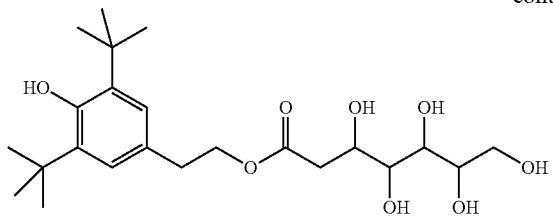
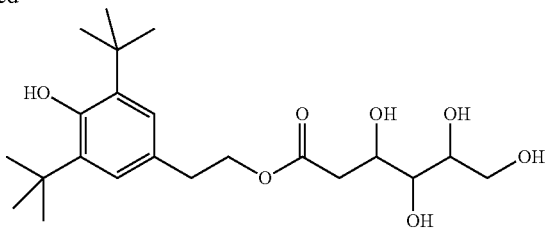
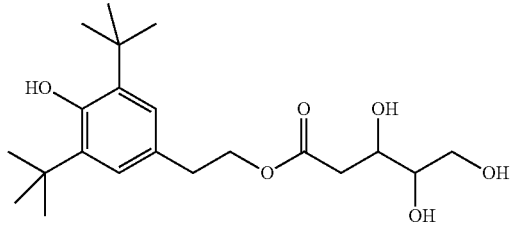
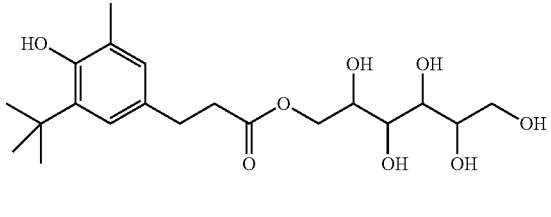
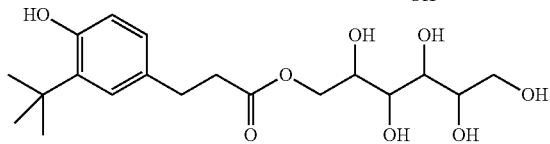
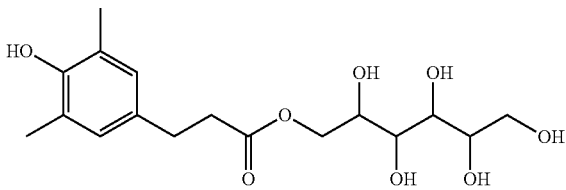
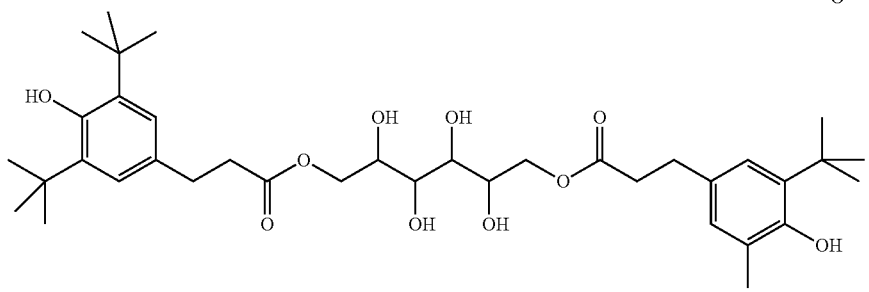
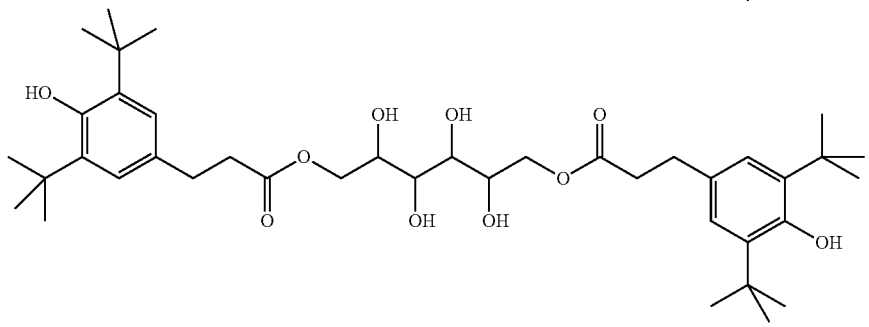
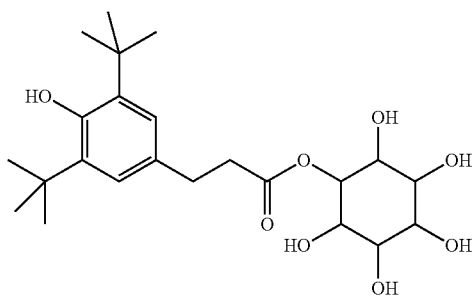

and mixtures and combinations hereof.

The at least one phenolically substituted sugar derivative can preferably be used in a total amount of 0.01 to 10% by weight, preferably 0.05 to 5% by weight, particularly preferably 0.1 to 3% by weight, based on the plastic material.

In particular, high stabilizing effects result when the at least one phenolic substituted sugar derivative is used in combination with a primary and/or secondary antioxidant that differs from the at least one phenolic substituted sugar derivative, wherein the at least one antioxidant preferably is selected from the group consisting of phenolic antioxidants, amines, lactones and mixtures hereof, and the at least one secondary antioxidant is selected from the group consisting of phosphorus compounds, in particular phosphites and phosphonites, organosulfur compounds, in particular sulfides and disulfides, and mixtures hereof.

Suitable primary antioxidants are phenolic antioxidants, amines and lactones

Suitable synthetic phenolic antioxidants are, for example:

Alkylated monophenols, such as 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear or branched nonylphenols such as 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof;

- alkylthiomethyl phenols, such as 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol;
- hydroquinones and alkylated hydroquinones, such as 2,6-di-tert-butyl-4-methyoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenylstearate, bis(3,5-di-tert-butyl-4-hydroxyphenyl)adipate;
- hydroxylated thiodiphenyl ethers, such as 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide;
- alkylide bisphenols such as 2,2'methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclhexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethyleneglycol-bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra(5-tert-butyl-4-hydroxy-2-methylphenyl)pentane;
- O-, N- and S-benzyl compounds such as 3,5,3',5'-tetra-tert-butyl-4,4'-dihydroxydibenzylether, cctadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate;
- hydroxybenzylated malonates such as dioctadecyl-2,2-bis(3,5-di-tert-butyl-2-hydroxybenzyl)malonate, dioctadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate;
- aromatic hydroxybenzyl compounds, such as 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol;
- triazine compounds, such as 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl)isocyanurate;
- benzyl phosphonates, such as dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethylester of 3,5-di-tert-butyl-4-hydroxybenzylphosphonic acid;
- acylaminophenols, such as 4-hydroxylauranilide, 4-hydroxystearanilide, octyl-N-(3,5-di-tert-butyl-4-hydroxyphenyl)carbamate;
- esters of β-(3,5-di-tert-butyl-4-hydroxyphenyl)propionic acid with mono- or polyhydric alcohols, such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;
- esters of β-(5-tert-butyl-4-hydroxy-3-methylphenyl)propionic acid with mono- or polyhydric alcohols, such as methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, 3,9-bis[2-{3-(3-tert-butyl-4-hydroxy-5-methylphenyl)propionyloxy}-1,1-dimethylethyl]-2,4,8,10-tetraoxaspiro[5.5]undecane;
- esters of β-(3,5-di-tert-butyl-4-hydroxyphenyl)propionic acid with mono- or polyhydric alcohols, such as methanol, ethanol, octanol, octadecanol, 1,6-hexanediol, 1,9- nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

esters of the (3,5-di-tert-butyl-4-hydroxyphenyl acetic acid with monovalent or polyvalent alcohols, for example, methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

amides of β-(3,5-di-tert-butyl-4-hydroxyphenyl)propionic acid, such as N,N'-bis(3,5-di-tert-butyl-4-hydroxyphenylpropionyl)hexamethylene diamide, N,N'-bis(3,5-di-tert-butyl-4-hydroxyphenylpropionyl) hexamethylene diamide, N,N'-bis(3,5-di-tert-butyl-4-hydroxyphenylpropionyl)hexamethylene diamide, N,N'-bis(3,5-di-tert-butyl-4-hydroxyphenylpropionyl) hydrazide, N,N'-bis[2-(3-[3,5-di-tert-butyl-4-hydroxyphenyl]propionyloxy)ethyl]oxamide (Naugard® XL-1, sold by SI group);

ascorbic acid (vitamin C).

Particularly preferred phenolic antioxidants are the following structures:

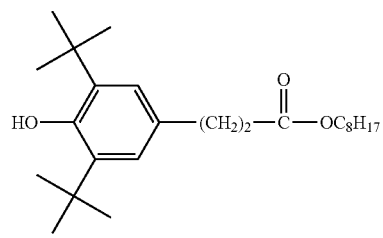

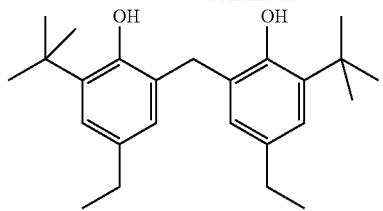

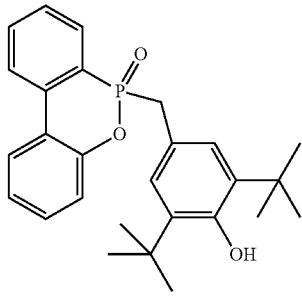

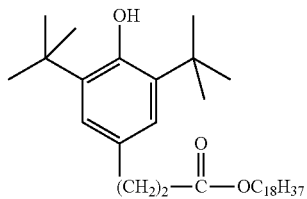

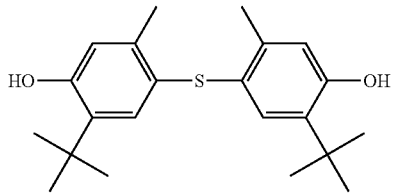

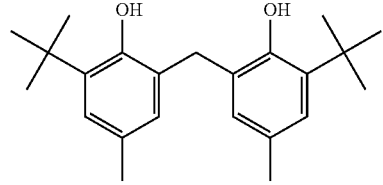

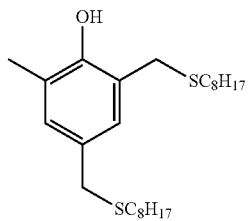

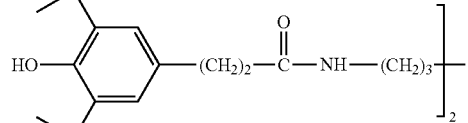

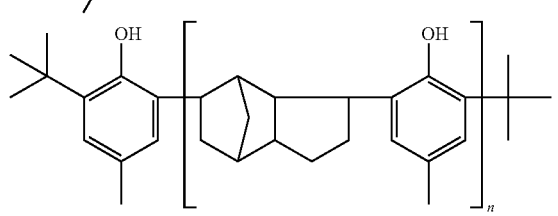

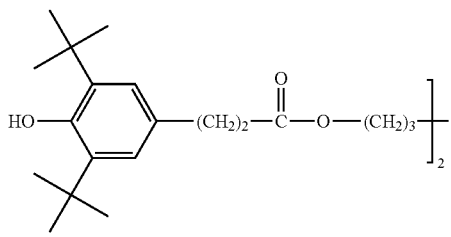

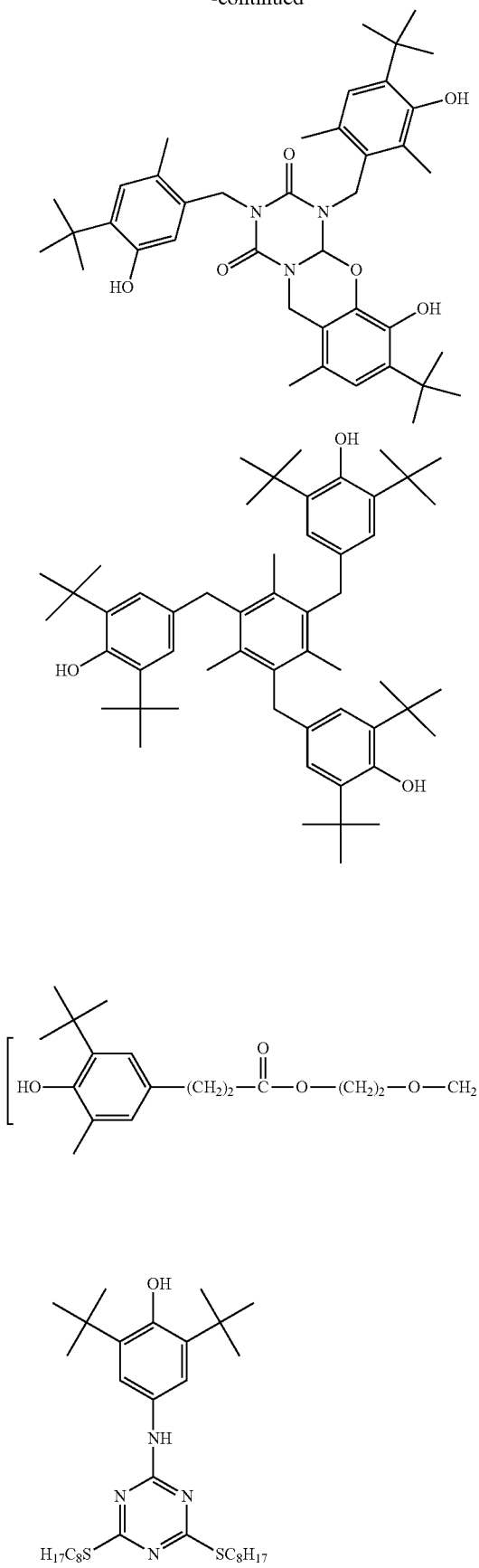
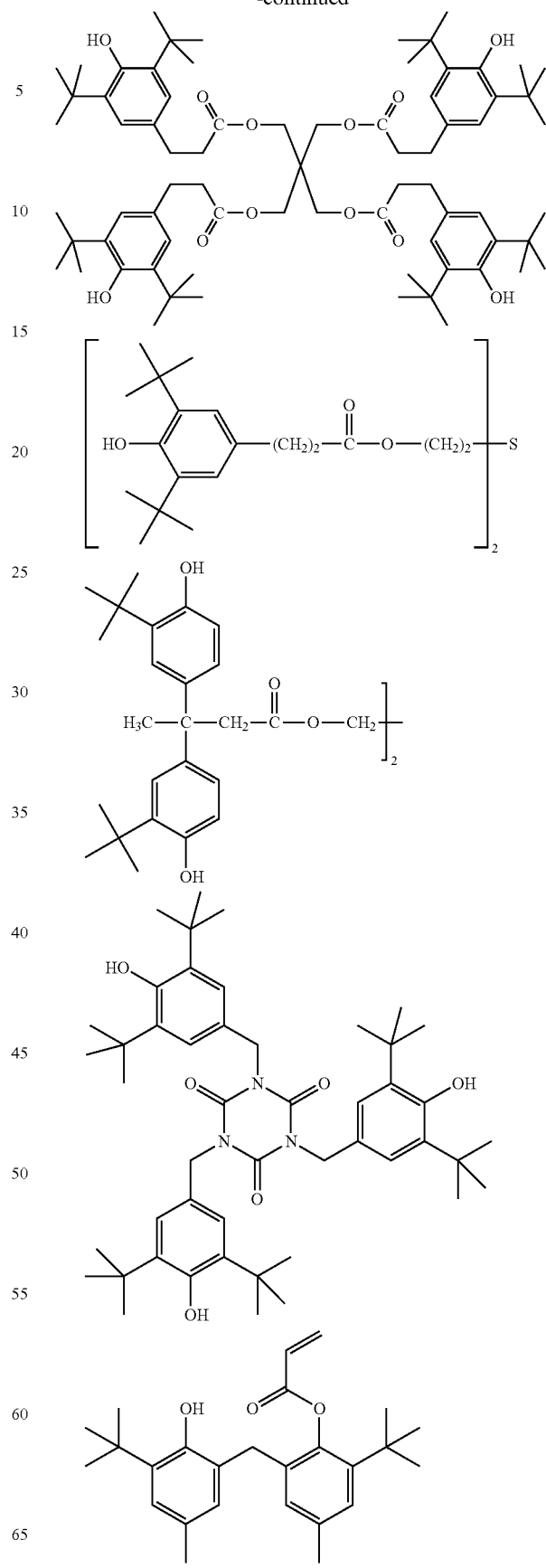

-continued

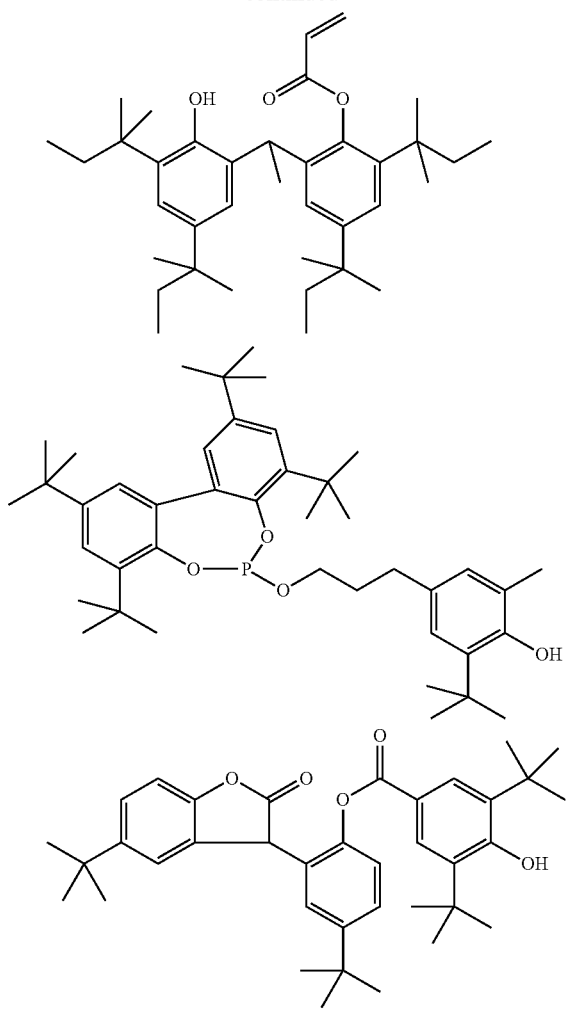

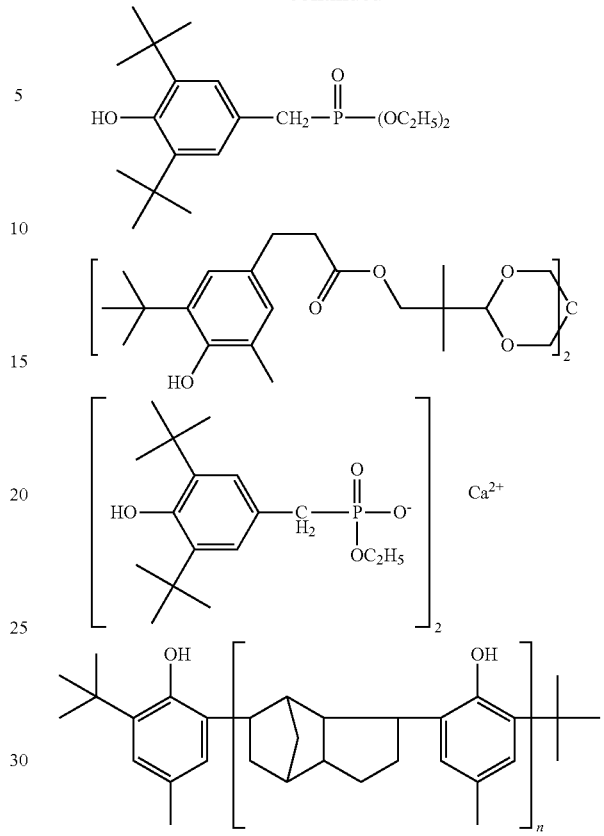

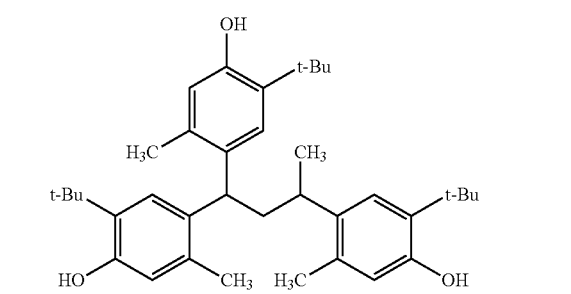

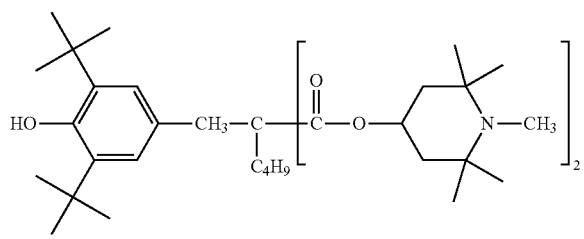

where n in the compounds named above is a whole number and is between 2 and 10.

Further preferred phenolic antioxidants are phenolic antioxidants based on renewable raw materials such as α-, β-, γ-, δ-tocopherol and mixtures thereof (vitamin E), tocotrienols, tocomonoenols, ubiquinol, hydroxytyrosol, flavonoids and flavonols such as chrysin, quercitin, hesperidin, neohesperidin, naringin, morin, kaempferol, fisetin, datiscetin, luteolin, apigenin, taxifolin, isoflavones such as genistein, genistin, daidzein, daidzin, formononetin, anthocyanins such as delphinidin and malvidin, curcumin, carnosic acid, carnosol, rosmarinic acid, tannin and resveratrol and carotenoids having alcoholic groups such as beta-cryptoxanthin, lutein, zeaxanthin or astaxanthin Further stabilizers, in particular for polyamides, are copper-1 halides, for example, CuI, CuBr, optionally in mixtures with alkali halides such as KI or KBr or Cu(I) complexes, for example, with triphenylphosphine.

Suitable aminic antioxidants are, for example:

N,N'-di-isopropyl-p-phenylene diamine, N,N'-di-sec-butyl-p-phenylene diamine, N,N'-bis(1,4-dimethylpentyl)-p-phenylene diamine, N,N'-bis(1-ethyl-3-methylpentyl)-p-phenylene diamine, N,N'-bis(1-methylheptyl)-p-phenylene diamine, N,N'-dicyclohexyl-p-phenylene diamine, N,N'-diphenyl-p-phenylene diamine, N,N'-bis(2-naphthyl)-p-phenylene diamine, N-isopropyl-N'-phenyl-p-phenylene diamine, N-(1,3-dimethylbutyl)-N'-phenyl-p-phenylene diamine, N-(1-methylheptyl)-N'-phenyl-p-phenylene diamine, N-cyclohexyl-N'-phenyl-p-phenylene diamine, 4-(p-toluene sulfamoyl)diphenylamine, N,N'-dimethyl-N,N'-di-sec-butyl-p-phenylene diamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylamino-phenol, bis(4-methoxyphenyl)amine, 2,6-di-tert-butyl-4-dimethyl-aminomethyl-phenol, 2,4'-diaminodiphenylmethane, 4,4'-diaminodiphenylmethane, N,N,N',N'-tetra-methyl-4,4'-di-aminodiphenylmethane, 1,2-bis[(2-methyl-phenyl)amino]ethane, 1,2-bis(phenylamino)propane, (o-tolyl)biguanide, bis[4-(1',3'-dimethylbutyl)phenyl]amine, Cert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyl-diphenylamines, a mixture of mono- and dialkylated Cert-butyldiphenylamines, 2,3-dihydro-3,3-dimethyl-4H-1,4-benzothiazine, phenothiazine, a mixture of mono- and dialkylated Cert-butyl/tert-octylphenothiazines, a mixture of mono- and dialkylated Cert-octylphenothiazinene, N-allylphenothiazine, N,N,N',N'-tetraphenyl-1,4-diaminobut-2-ene and mixtures or combinations hereof.

Preferred aminic antioxidants are: N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-NT-phenyl-p-phenylenediamine, N-(1-methylheptyl)-N'-phenyl-p-phenylenediamine, N-cyclohexyl-N'-phenyl-p-phenylenediamine Particularly preferred aminic antioxidants are the following structures:

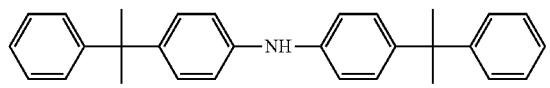

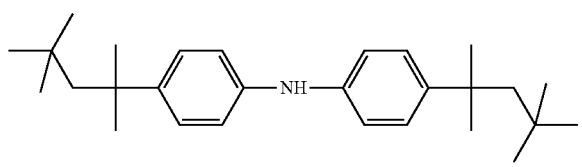

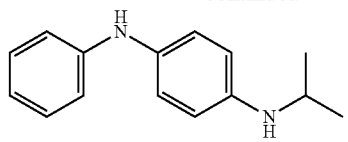

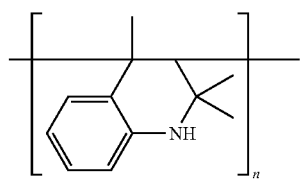

where n is a whole number and is between 3 and 100.

Further preferred aminic antioxidants are hydroxylamines or N-oxides (nitrones), such as N, N-dialkylhydroxylamines, N,N-dibenzylhydroxylamine, N,N-dilaurylhydroxylamine, N,N-distearylhydroxylamine, N-benzyl-α-phenylnitrone, N-octadecyl-α-hexadecylnitron, and Genox™ EP (SI Group) according to the formula:

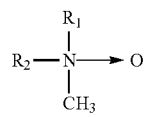

R₁, R₂ = C₁₄–C₂₄ alkyl chains

Suitable lactones are benzofuranones and indolinones such as 3-(4-(2-acetoxyethoxy)-phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-(2-hydroxyethoxy]phenyl)benzofuran-2-one), 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one and lactones that also contain phosphite groups such as

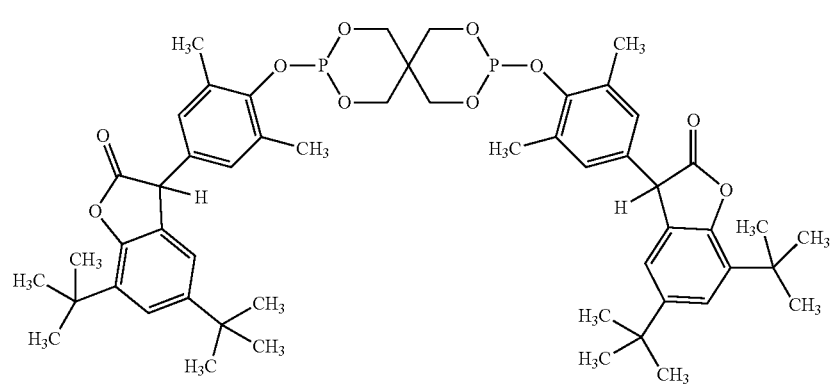

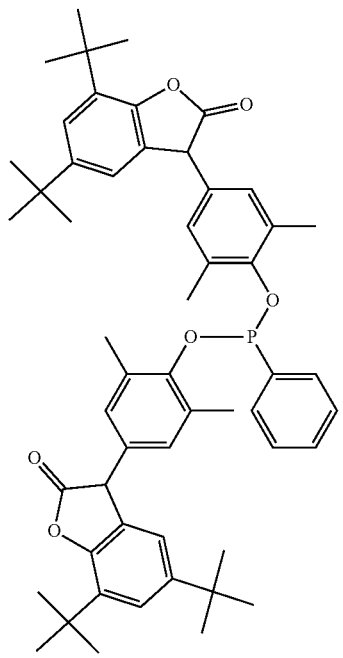
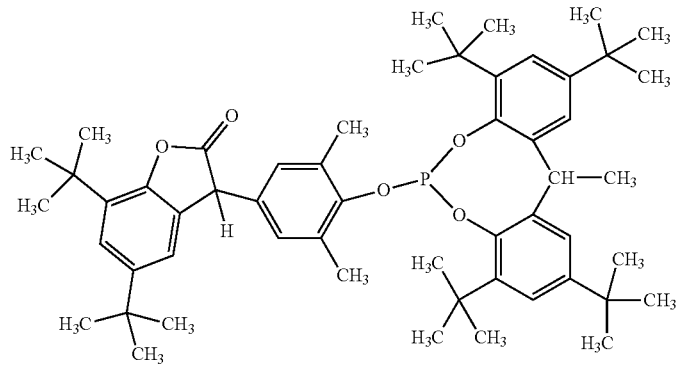

A further suitable group of antioxidants are isoindolol[2,1-A]quiinazolines such as

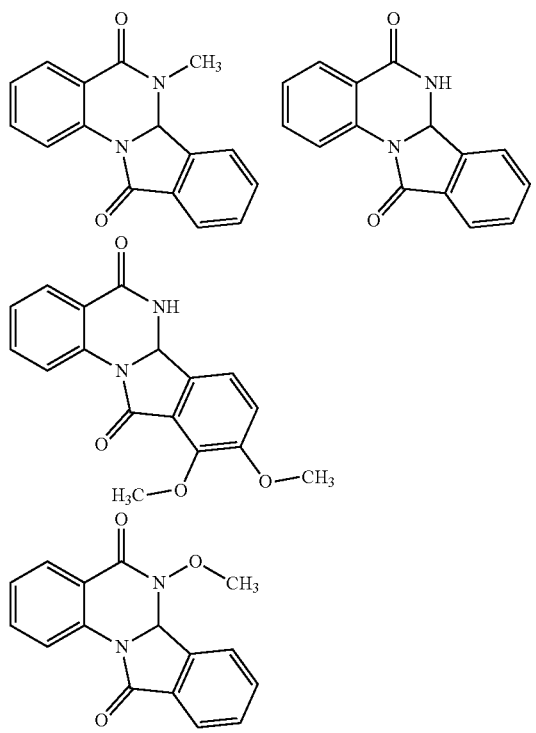

Suitable secondary antioxidants (B) are phosphorus compounds such as phosphites and phosphonites, and organosulfur compounds such as sulfides and disulfides.

Suitable phosphites/phosphonites are, for example: triphenylphosphite, diphenylalkylphosphite, phenyldialkylphosphite, tri(nonylphenyl)phosphite, trilaurylphosphite, trioctadecylphosphite, distearylpentaerythritoldiphosphite, tris-(2,4-di-tert-butylphenyl)phosphite, diisodecylpentaerythritoldiphosphite, bis(2,4-di-tert-butylphenyl)pentaerythritoldiphosphite, bis(2,4-di-cumylphenyl)pentaerythritoldiphosphite, bis(2,6-di-tert-butyl-4-methylphenyl)pentaerythritoldiphosphite, diisodecyloxypentaerythritoldiphosphite, bis(2,4-di-tert-butyl-6-methylphenyl)pentaerythritoldiphosphite, bis(2,4,6-tris(tert-butylphenyl)pentaerythritoldiphosphite, tristearylsorbitoltriphosphite, tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocine, bis(2,4-di-tert-butyl-6-methylphenyl) methylphosphite, bis(2,4-di-tert-butyl-6-methylphenyl) ethylphosphite, 6-fluoro-2,4,8,10-tetra-tert-butyl-12-methyl-dibenz[d,g]-1,3,2-dioxaphosphocine, 2,2'2"-nitrilo[triethyltris(3,3",5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl))phosphite, 5-butyl-5-ethyl-2-(2,4,6-tri-tert-butylphenoxy)-1,3,2-dioxaphosphirane.

Particularly preferred phosphites/phosphonites are:

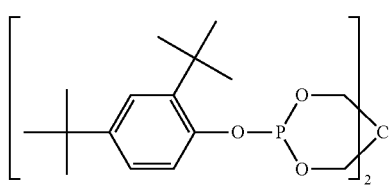
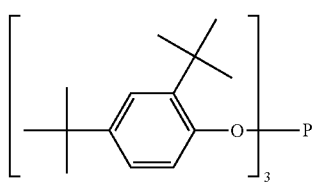

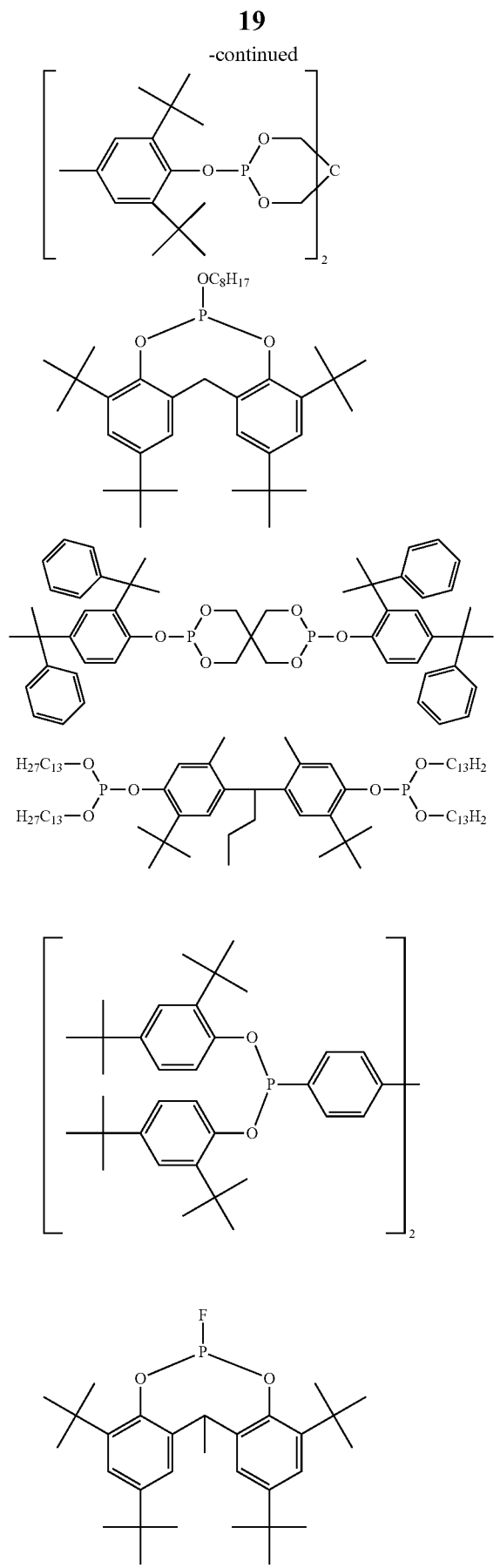
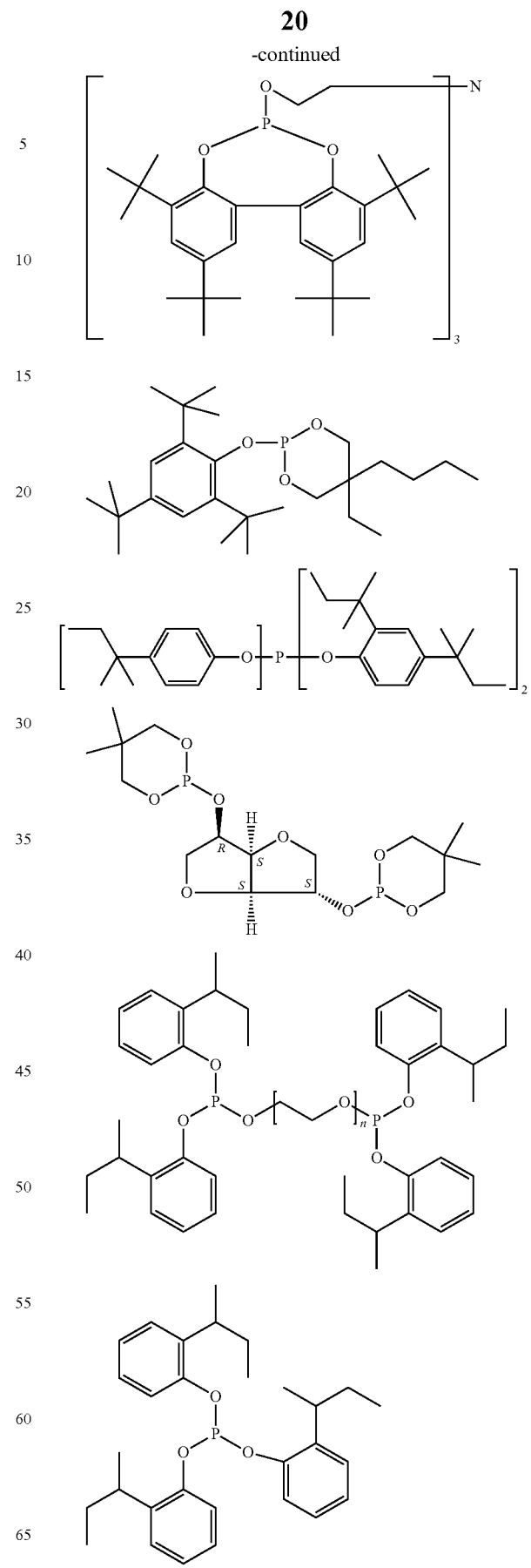

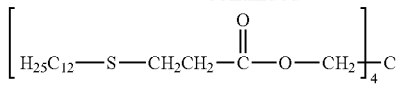

The aforementioned primary and/or secondary antioxidants can be used in a total amount (that is, as the sum of the primary and/or secondary antioxidant), based on the total amount of the at least one phenolically substituted sugar derivative from 0.01 to 5 parts by weight, preferably from 0.02 to 3 parts by weight, particularly preferably from 0.05 to 2 parts by weight.

In particular, it has proven to be advantageous when, based on 91 to 99.94 parts by weight, preferably 98.5 to 99.91 parts by weight, of the plastic material
 (A) 0.02 to 3 parts by weight, preferably 0.03 to 0.5 parts by weight of the at least one phenolically substituted sugar derivative, and
 (B) 0.04 to 6 parts by weight, preferably 0.06 to 1 parts by weight, of the at least one primary antioxidant and/or of the at least one secondary antioxidant are introduced.

The plastic materials are in particular thermoplastic, thermoset or elastomeric polymers. Suitable thermoplastic or thermoset polymers are in particular:
 a) polymers made from olefins or diolefins such as polyethylene (LDPE, LLDPE, VLDPE, ULDPE, MDPE, HDPE, UHMWPE), metallocene PE (m-PE), polypropylene, polyisobutylene, poly-4-methyl-pentene-1, polybutadiene, polyisoprene, such as natural rubber (NR), polycyclooctene, polyalkylene-carbon monoxide copolymers, and copolymers in the form of random or block structures such as polypropylene-polyethylene (EP), EPM or EPDM with, for example, 5-ethylidene-2-norbornene as comonomer, ethylene vinyl acetate (EVA), ethylene-acrylic esters such as ethylene-butyl acrylate, ethylene-acrylic acid and its salts (ionomers), and terpolymers such as ethylene-acrylic acid-glycidyl(meth)acrylate, graft polymers such as polypropylene-graft-maleic anhydride, polypropylene-graft-acrylic acid, polyethylene-graft-acrylic acid, polyethylene-polybutyl acrylate-graft-maleic anhydride and blends such as LDPE/LLDPE or long-chain branched polypropylene copolymers that are produced with alpha-olefins as comonomers, such as with 1-butene, 1-hexene, 1-octene or 1-octadecene
 b) polystyrene, polymethylstyrene, poly-alpha-methylstyrene, polyvinylnaphthalene, polyvinylbiphenyl, polyvinyltoluene, styrene-butadiene (SB), styrene-butadiene-styrene (SBS), styrene-ethylene-butylene-styrene (SEBS), styrene-ethylene-propylene-styrene, styrene-isoprene, styrene-isoprene-styrene (SIS), styrene-butadiene-acrylonitrile (ABS), styrene-acrylonitrile (SAN), styrene-acrylonitrile-acrylate (ASA), styrene-ethylene, styrene-maleic anhydride polymers incl. corresponding graft copolymers such as styrene on butadiene, maleic

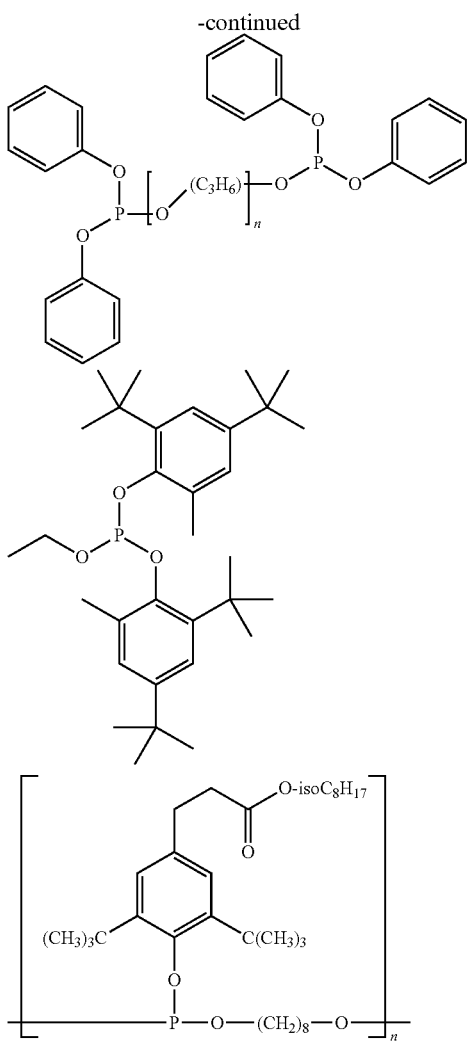

where n=3-100.
A preferred phosphonite is:

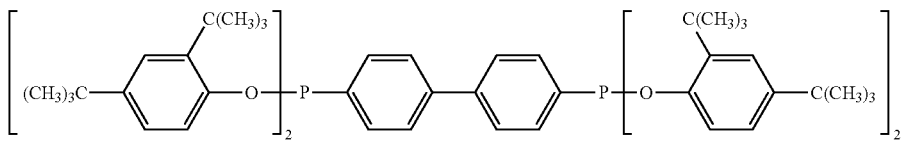

Suitable sulfur compounds are, for example, distearyl thiodipropionate, dilauryl thiodipropionate; ditridecyldithiopropionate, ditetradecylthiodipropionate, 3-(dodecylthio)-1,1'-[2,2-bis[[3-(dodecylthio)-1-oxopropoxy]methyl]-1,3-propanediyl]propanoic acid ester. The following structures are preferred:

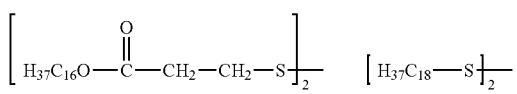

anhydride on SBS or SEBS, and graft copolymers made of methyl methacrylate, styrene-butadiene and ABS (MABS), and hydrogenated polystyrene derivatives such as polyvinylcyclohexane c) halogen-containing polymers such as polyvinyl chloride (PVC), polychloroprene and polyvinylidene chloride (PVDC), copolymers made from vinyl chloride and vinylidene chloride or from vinyl chloride and vinyl acetate, chlorinated polyethylene, polyvinylidene fluoride, epichlorohydrin homo and copolymers in particular with ethylene oxide (ECO)

d) polymers of unsaturated esters such as polyacrylates and polymethacrylates such as polymethyl methacrylate (PMMA), polybutyl acrylate, polylauryl acrylate, polystearyl acrylate, polyglycidyl acrylate, polyglycidyl methacrylate, polyacrylonitrile, polyacrylamides, copolymers such as polyacrylonitrile-polyalkylacrylate, e) polymers made from unsaturated alcohols and derivatives, such as polyvinyl alcohol, polyvinyl acetate, polyvinyl butyral, polyallyl phthalate, polyallyl melamine f) polyacetals such as polyoxymethylene (POM) or copolymers with, for example, butanal, g) polyphenylene oxides and blends with polystyrene or polyamides, h) polymers of cyclic ethers such as polyethylene glycol, polypropylene glycol, polyethylene oxide, polypropylene oxide, polytetrahydrofuran, i) polyurethanes, made from hydroxy-terminated polyethers or polyesters and aromatic or aliphatic isocyanates such as 2,4- or 2,6-tolylene diisocyanate or methylenediphenyl diisocyanate, in particular linear polyurethanes (TPU), polyureas, j) polyamides such as polyamide-6, 6.6, 6.10, 4.6, 4.10, 6.12, 10.10, 10.12, 12.12, polyamide 11, polyamide 12 and (partially) aromatic polyamides such as polyphthalamides, for example, made from terephthalic acid and/or isophthalic acid and aliphatic diamines such as hexamethylenediamine or m-xylylenediamine or from aliphatic dicarboxylic acids such as adipic acid or sebacic acid and aromatic diamines such as 1,4- or 1,3-diaminobenzene, blends of different polyamides such as PA-6 and PA 6.6 or blends of polyamides and polyolefins such as PA/PP k) polyimides, polyamide-imides, polyether imides, polyester imides, poly(ether)ketones, polysulfones, polyether sulfones, polyaryl sulfones, polyphenylene sulfides, polybenzimidazoles, polyhydantoins, l) polyesters made from aliphatic or aromatic dicarboxylic acids and diols or from hydroxycarboxylic acids such as polyethylene terephthalate (PET), polybutylene terephthalate (PBT), polypropylene terephthalate (PTT), polyethylene naphthylate (PEN), poly-1,4-dimethylolcyclohexane terephthalate, polyhydroxybenzoate, polyhydroxynaphthalate, polyhydroxy acid (PLA), polyhydroxybutyrate (PHB), polyhydroxyvalerate (PHV), polyethylene succinate, polytetramethylene succinate, polycaprolactone m) polycarbonates, polyester carbonates and blends such as PC/ABS, PC/PBT, PC/PET/PBT, PC/PA n) cellulose derivatives, such as cellulose nitrate, cellulose acetate, cellulose propionate, cellulose butyrate, o) epoxy resins, consisting of di- or polyfunctional epoxy compounds in combination with, for example, hardeners based on amines, anhydrides, dicyandiamide, mercaptans, isocyanates or catalytically active hardeners, p) phenolic resins such as phenol-formaldehyde resins, urea-formaldehyde resins, melamine-formaldehyde resins, q) unsaturated polyester resins made from unsaturated dicarboxylic acids and diols with vinyl compounds, for example, styrene, alkyd resins, r) silicones, for example, based on dimethylsiloxanes, methyl-phenyl-siloxanes or diphenylsiloxanes, for example, terminated with vinyl groups s) and mixtures, combinations, or blends of two or more of the above-named polymers.

If the polymers specified under a) to r) are copolymers, these can exist in the form of statistical ("random"), block or "tapered" structures. Furthermore, the polymers mentioned can exist in the form of linear, branched, star-shaped or hyperbranched structures.

If the polymers specified under a) to r) are stereoregular polymers, they can exist in the form of isotactic, stereotactic, but also atactic forms or as stereoblock copolymers.

Furthermore, the polymers specified under a) to r) can have both amorphous and (partially) crystalline morphologies.

Optionally, the polyolefins mentioned under a) can also be crosslinked, for example, crosslinked polyethylene, which is then referred to as X-PE.

The present compounds can further be used to stabilize rubbers and elastomers. This can be natural rubber (NR) or synthetic rubber materials.

Polymers made from renewable raw materials such as polylactic acid (PLA), polyhydroxybutyric acid, polyhydroxyvaleric acid or polybutylene succinate are further preferred.

The aforementioned polymers can be fresh or recycled.

The present invention also relates to a plastic composition containing or consisting of at least one plastic material and at least one phenolically substituted sugar derivative, the sugar derivative having a body derived from a sugar, and at least one substituent according to general formula I

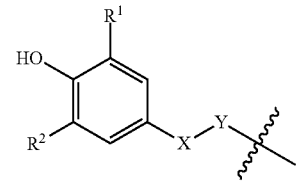

Formula I where $R^1$ and $R^2$ are identical or different on each occurrence and are selected from the group consisting of hydrogen and linear or branched alkyl radicals, with the proviso that at least one residue $R^1$ or $R^2$ is not hydrogen, X an alkylene group having 1 to 18 carbon atoms or a chemical bond, Y a grouping selected from the group consisting of the following groupings

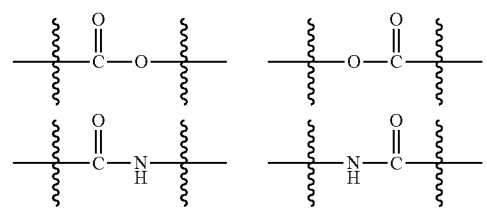

where the grouping X is bound to the terminus shown on the left of the groupings Y shown above, and where the body of the phenolically substituted sugar derivative derived from a sugar has at least 3 unsubstituted hydroxyl groups and/or the body of the phenolically substituted sugar derivative derived from a sugar has at least 4 carbon atoms and has at least 2, preferably at least 3, unsubstituted hydroxyl groups.

With regard to the phenolically substituted sugar derivatives according to formula I, reference is made to the above embodiments, which also apply without restriction to the plastic composition according to the invention.

The plastic composition can preferably also contain at least one additive which is selected from the group consisting of UV absorbers, light stabilizers, metal deactivators, costabilizers, filler deactivators, antiozonants, nucleating agents, anti-nucleating agents, impact strength improvers, plasticizers, lubricants, rheology modifiers, thixotropic agents, chain extenders, optical brighteners, antimicrobial agents, antistatic agents, slip agents, antiblocking agents, coupling agents, crosslinking agents, anti-crosslinking agents, hydrophilizing agents, hydrophobizing agents, adhesion promoters, dispersion agents, compatibilizers, oxygen scavengers, acid scavengers, blowing agents, prodegradants, defoaming agents, odor scavengers, marking agents, antifogging agents, fillers, reinforcing agents and mixtures thereof.

Possible additives are listed below, but they are not to be understood as exhaustive.

The plastic composition preferably additionally contains at least one additive selected from the group consisting of
 a) acid scavengers ("antiacids") are salts of one, two, three or tetravalent metals, preferably alkali, alkaline earth metals, aluminum or zinc, in particular formed with fatty acids such as calcium stearate, magnesium stearate, zinc stearate, aluminum stearate, calcium laurate, calcium behenate, calcium lactate, calcium stearoyl-2-lactate. Further classes of suitable acid scavengers are hydrolactites, in particular synthetic hydrolactites on the basis of aluminum, magnesium and zinc, hydrocalumites, zeolites, alkaline earth oxides, in particular calcium oxide and magnesium oxide and zinc oxide, alkaline earth carbonates, in particular calcium carbonate, magnesium carbonate, dolomite, and hydroxides, in particular brucite (magnesium hydroxide),
 b) light stabilizers, preferably light stabilizers from the group of hindered amines,
 c) dispersion agents, and
 d) mixtures thereof.

Suitable light stabilizers are, for example, compounds based on 2-(2'-hydroxyphenyl) benzotriazoles, 2-hydroxy benzophenones, esters of benzoic acids, acrylates, oxamides, and 2-(2-hydroxyphenyl)-1,3,-5-triazines.

Suitable 2-(2'-hydroxyphenyl)benzotriazoles are, for example, 2-(2'-hydroxy-5'methylphenyl)benzotriazole, 2-(3',5'-di-tert-butyl-2'-hydroxyphenyl)benzotriazole, 2-(5'-tert-butyl-2'-hydroxy-phenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl-5-chlorobenzotriazole, 2-(3'-sec-butyl-5'-tert-butyl-2'-hydroxy-phenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol]; the product of the transesterification of 2-[3'-tert-butyl-5'-(2-methoxycarbonylethyl)-2'-hydroxyphenyl]-2H-benzotriazole with polyethyleneglycol 300; [R—CH$_2$CH$_2$—COO—CH$_2$CH$_2$—]—$_2$, where R=3'-tert-butyl-4'-hydroxy-5'-2H-benzotriazole-2-ylphenyl, 2-[2'-hydroxy-3'-(α,α-dimethylbenzyl)-5'-(1,1,3,3-tetramethylbutyl)phenyl]benzotriazole, 2-[2'-hydroxy-3'-(1,1,3,3-tetramethylbutyl)-5'-(α,α-dimethylbenzyl)phenyl]benzotriazole.

Suitable 2-hydroxybenzophenones are, for example, 4-hydroxy-, 4-methoxy-, 4-octyloxy-, 4-decyloxy-4-dodecyloxy, 4-benzyloxy, 4,2',4'-trihydroxy- and 2'-hydroxy-4,4'-dimethyoxy derivatives of the 2-hydroxy benzophenones.

Suitable acrylates are, for example, ethyl-α-cyano-β,β-diphenylacrylate, isooctyl-α-cyano-β,β-diphenylacrylate, methyl-α-carbomethoxycinnamate, methyl-α-cyano-β-methyl-p-methoxycinnamate, butyl-α-cyano-β-methyl-p-methoxycinnamate, methyl-α-carbomethoxy-p-methoxycinnamate and N-(β-carbomethoxy-β-cyanovinyl)-2-methylindoline.

Suitable esters of benzoic acids are, for example, 4-tert-butylphenylsalicylate, phenylsalicylate, octylphenylsalicylate, dibenzoylresorcinol, bis(4-tert-butylbenzoyl)resorcinol, benzoylresorcinol, 2,4-di-tert-butylphenyl-3,5-di-tert-butyl-4-hydroxybenzoate, hexadecyl-3,5-di-tert-butyl-4-hydroxybenzoate, octadecyl-3,5-di-tert-butyl-4-hydroxybenzoate, 2-methyl-4,6-di-tert-butylphenyl-3,5-di-tert-butyl-4-hydroxybenzoate.

Suitable oxamides are, for example, 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixtures with 2-ethoxy-2'-ethyl-5,4'-di-tert-butoxanilide, mixtures of o- and p-methoxy-disubstituted oxanilides and mixtures of o- and p-ethoxy-disubstituted oxanilides.

Suitable 2-(2-hydroxyphenyl)-1,3,5-triazines are, for example, 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)-phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2- hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl-1,3,5-triazine.

Suitable metal deactivators are, for example, N,N'-diphenyloxamide, N-salicylal-N'-salicyloylhydrazine, N,N'-bis(salicyloyl)hydrazine, N,N'-bis(3,5-di-tert-butyl-4-hydroxyphenylpropionyl)hydrazin, 3-salicyloylamino-1,2,4-triazole, bis(benzylidene)oxalyldihydrazide, oxanilide, isophthaloyldihydrazide, sebacoyl-bis-phenylhydrazide, N,N'-diacetyladipoyldihydrazide, N,N'-bis(salicyloyl)oxylyldihydrazide, N,N'-bis(salicyloyl)thiopropionyldihydrazide.

Particularly preferred as metal deactivators are:

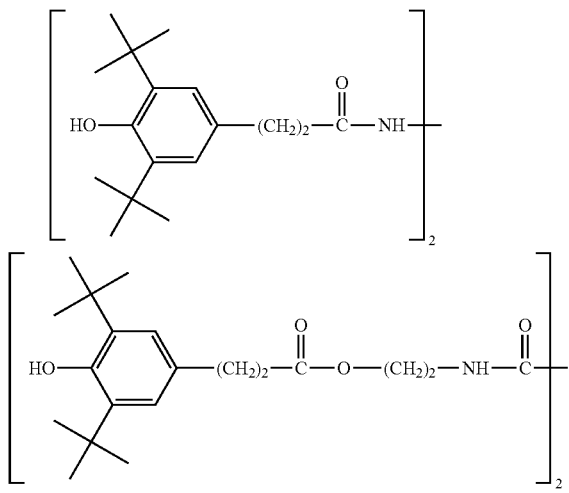

Suitable hindered amines are, for example, 1,1-bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)-n-butyl-3,5-di-tert-butyl-4-hydroxybenzylmalonate, the condensation product of 1-(2-hydroxyethyl)-2,2,6,6-tetramethyl-4-hydroxypiperidine and succinic acid, linear or cyclic condensation products of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracar- boxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, linear or cyclic condensation products from N,N'-bis(2,2,6,6-tetramethyl-4-piperidyl)hexamethylenediamine and 4-morpholino-2,6-dichloro-1,3,5-triazine the reaction product of 7,7,9,9-tetramethyl-2-cycloundecyl-1-oxa-3,8-diaza-4-oxospiro-[4,5]decane and epichlorohydrin.

The sterically hindered N—H, N-alkyl such as N-methyl or N-octyl, the N-alkoxy derivatives such as N-methoxy or N-octyloxy, the cycloalkyl derivatives such as N-cyclohexyloxy and the N-(2-hydroxy-2-methylpropoxy) analogs are also each included in the above-given structures here.

Preferred hindered amines furthermore have the following structures:

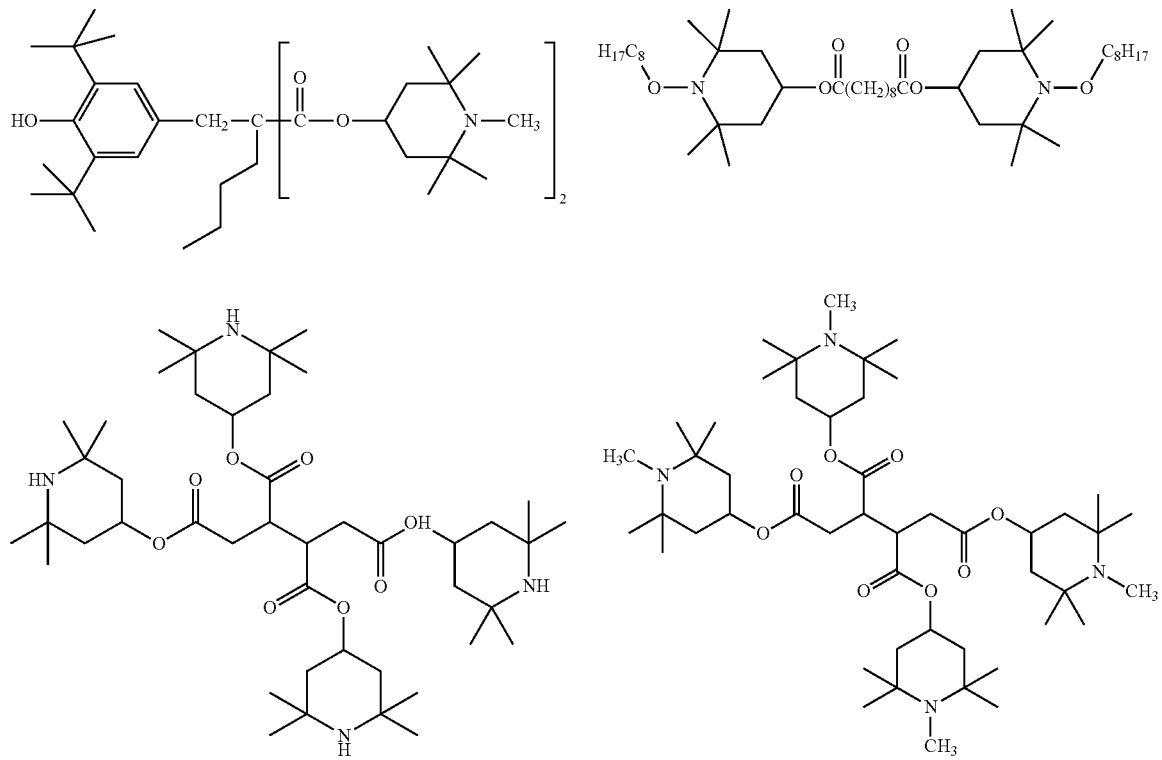

-continued
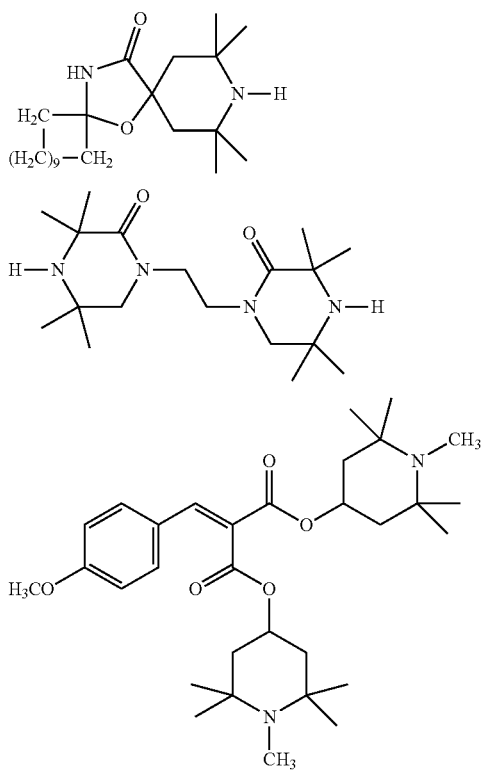
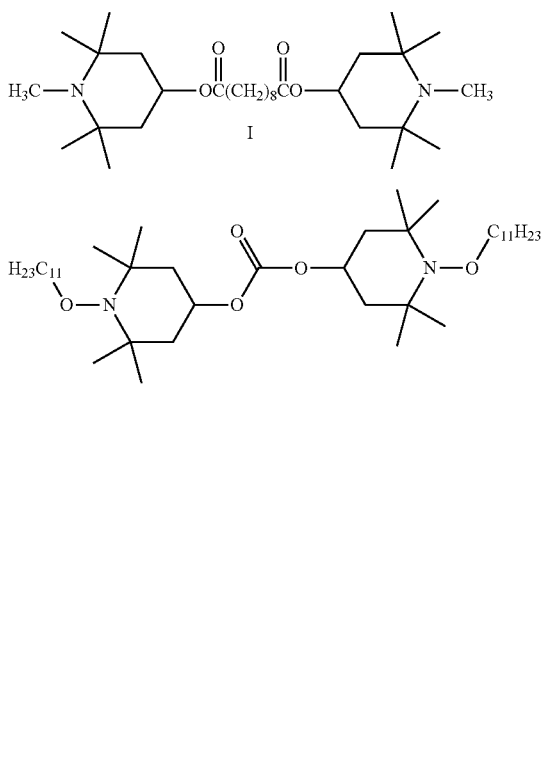
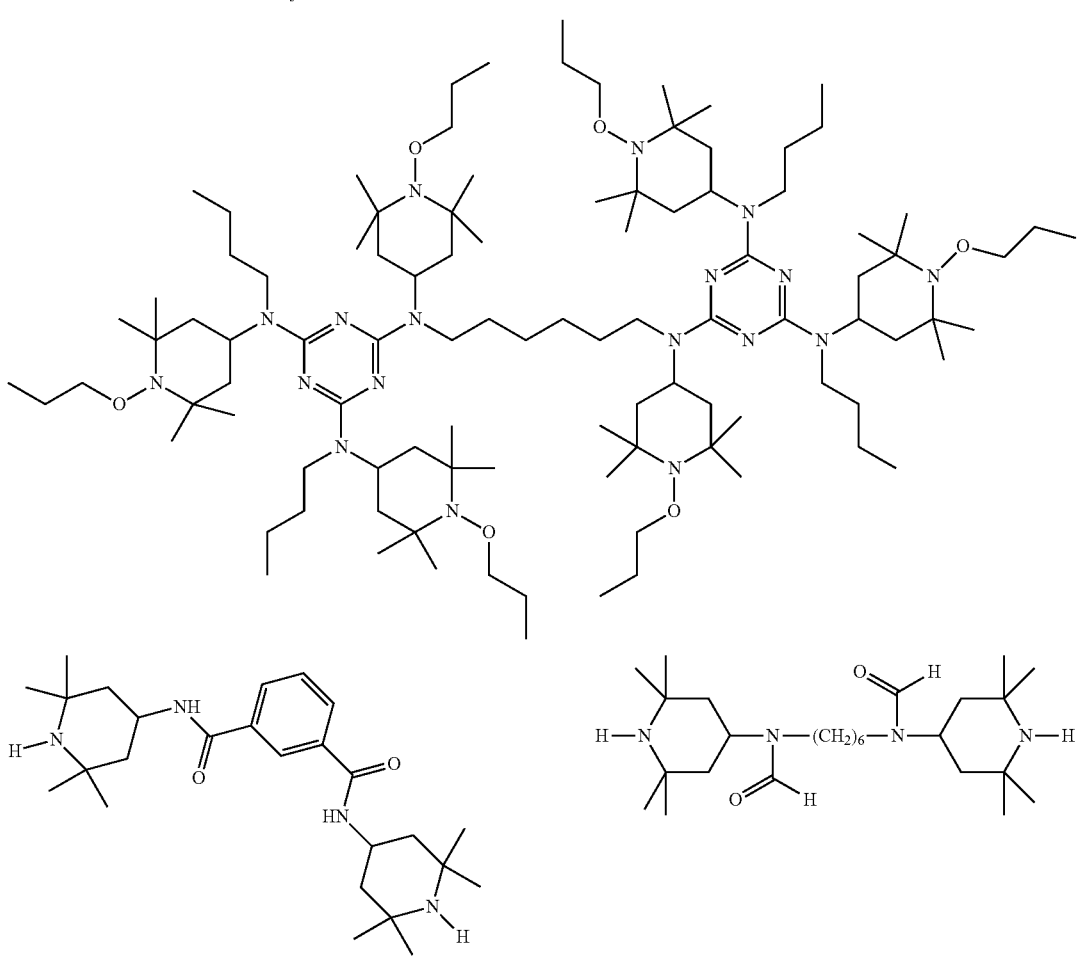

-continued
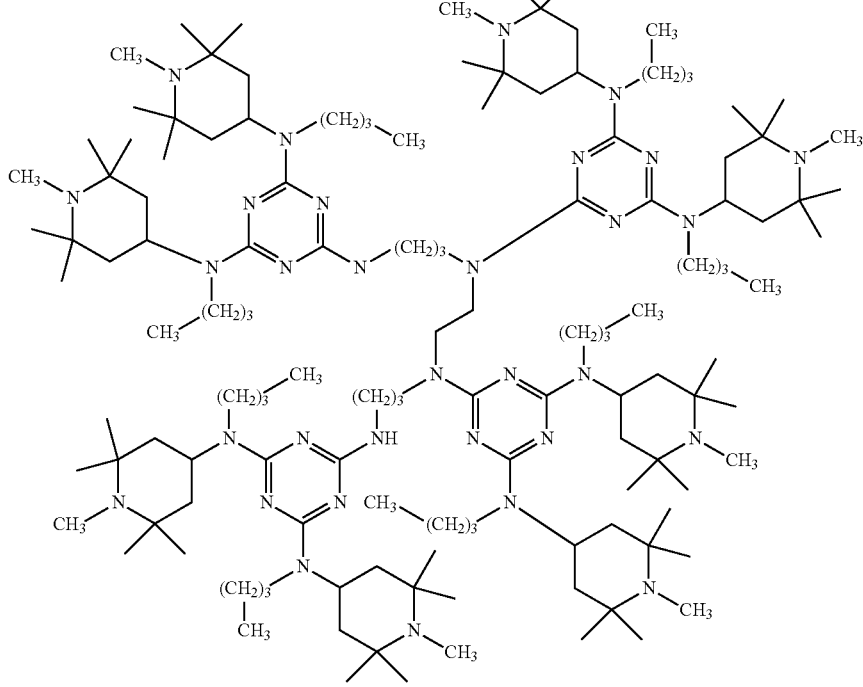
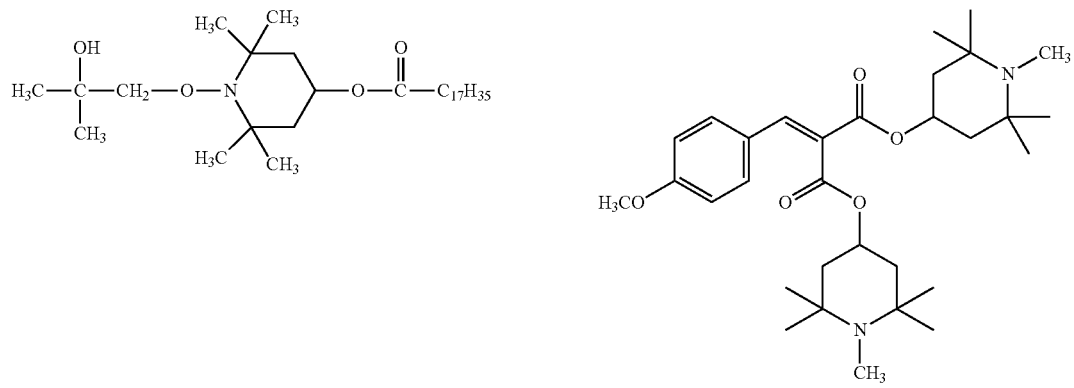

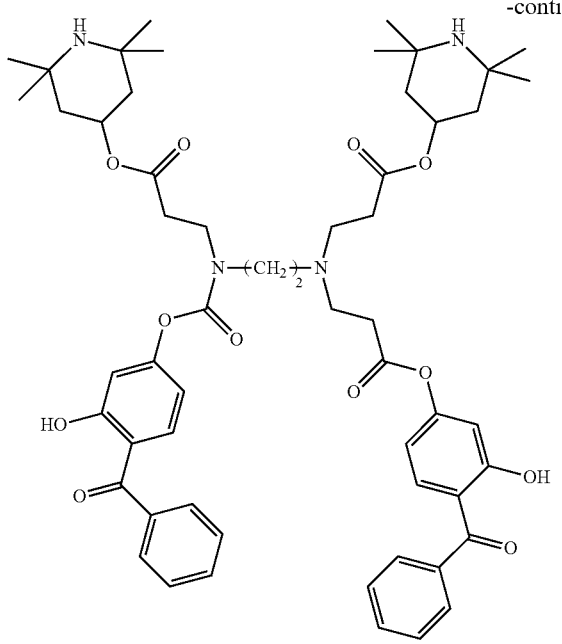
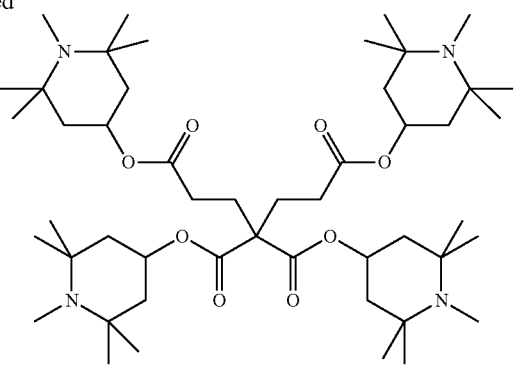
Preferred oligomeric and polymeric hindered amines have the following structures:
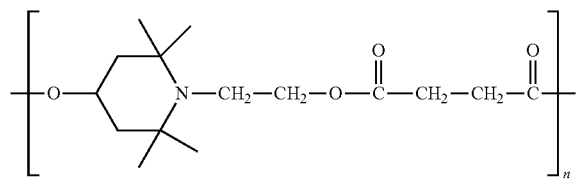
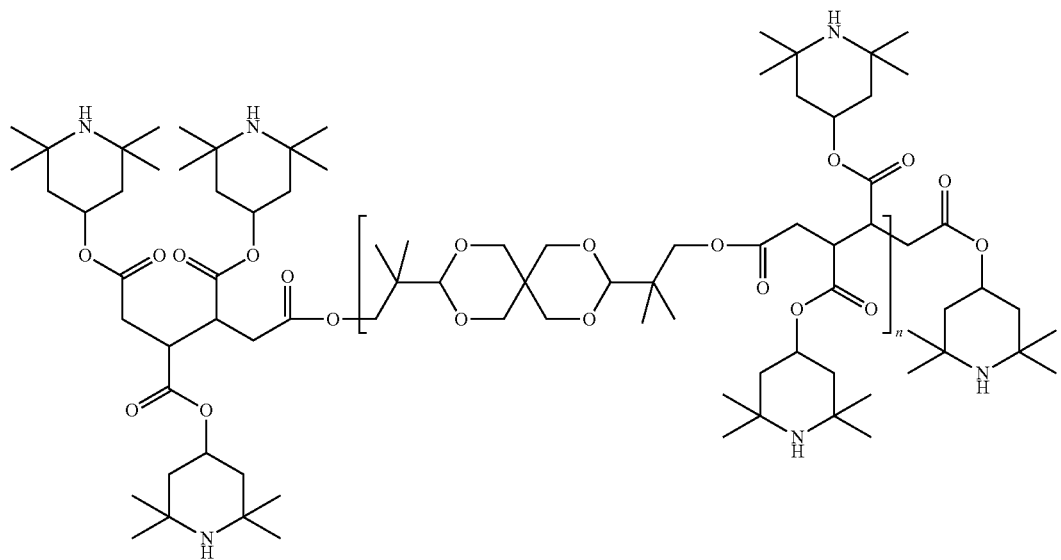

-continued
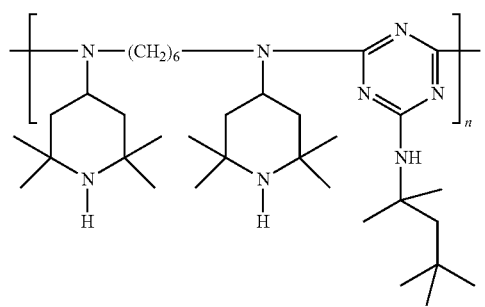
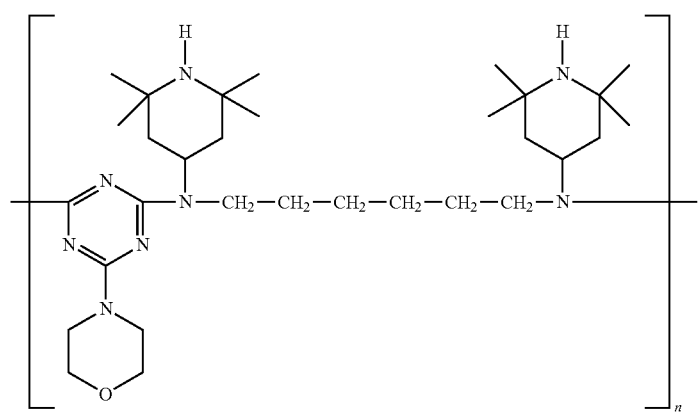
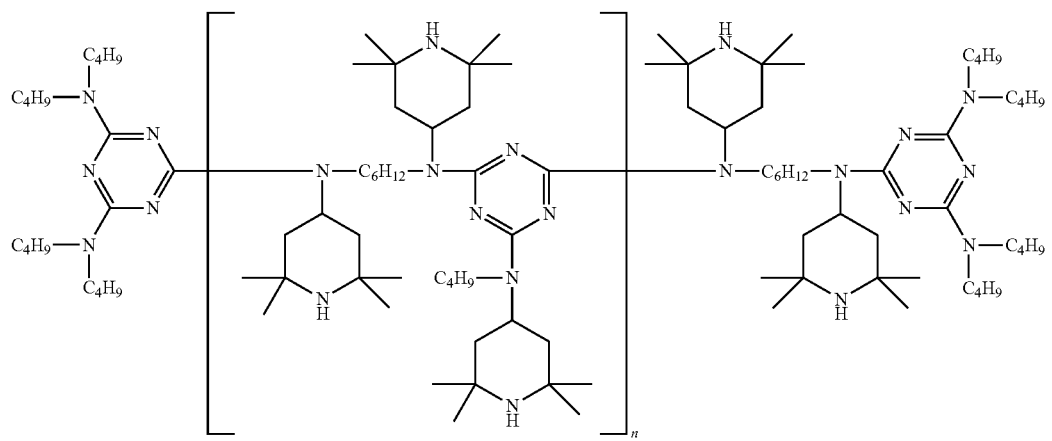

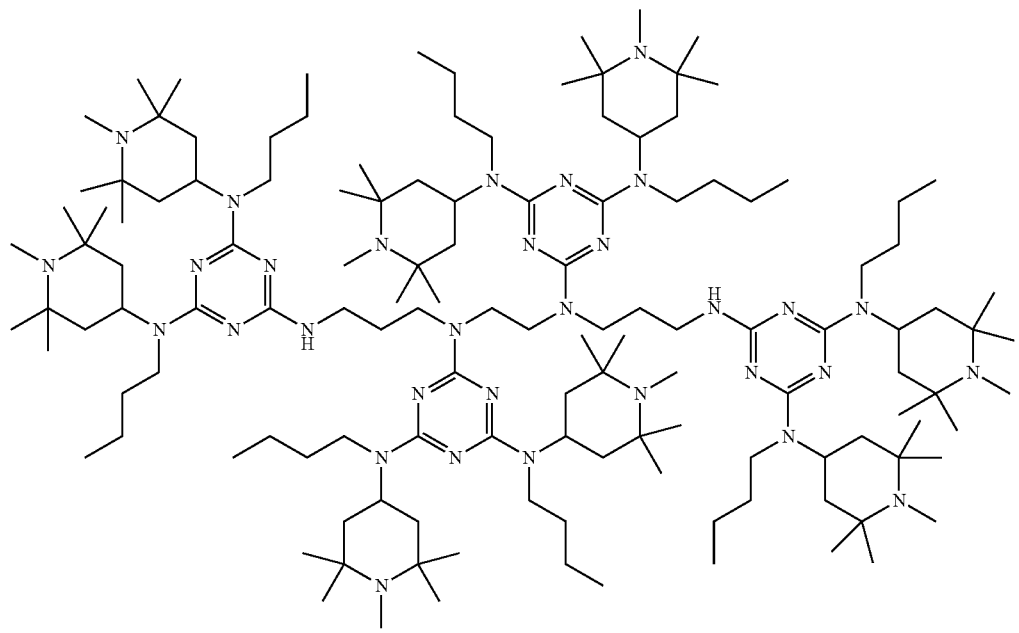
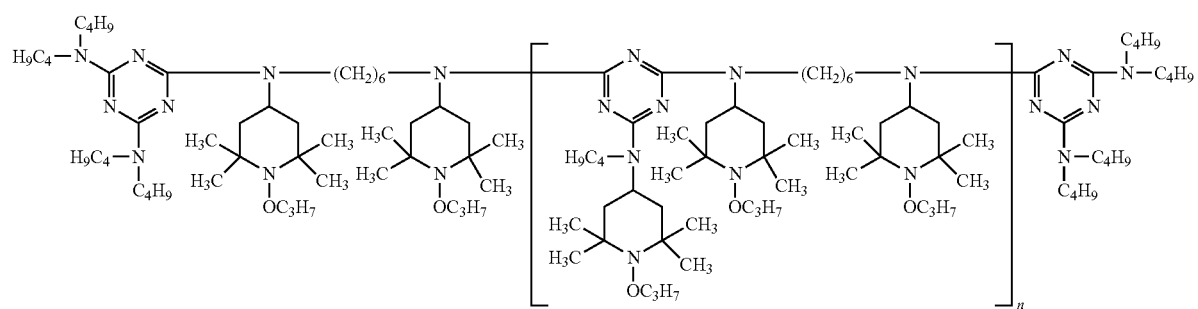
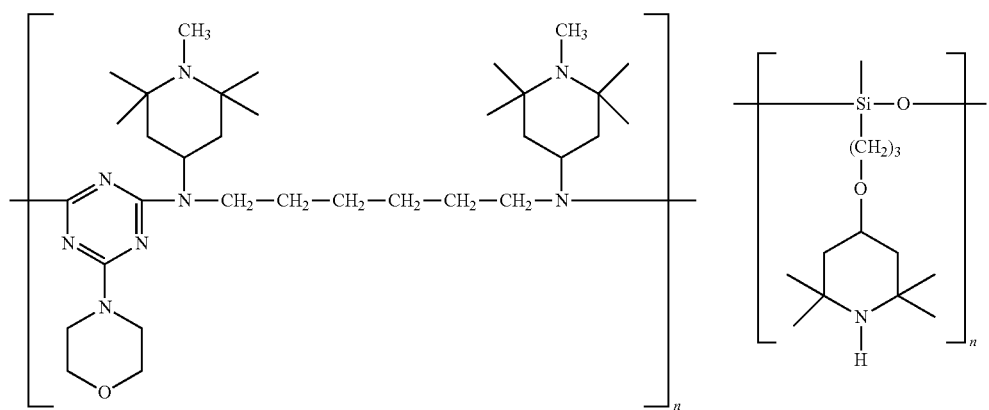
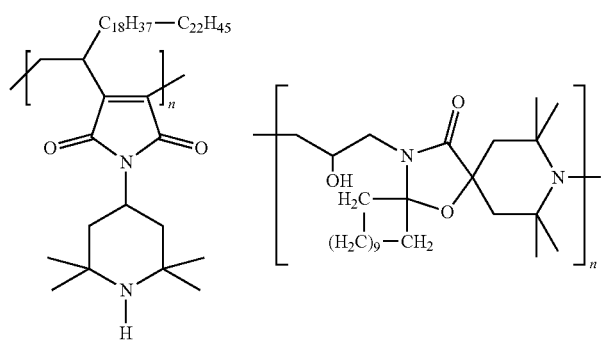

In the above-named compounds, n respectively means 3 to 100.

A further suitable light stabilizer is Hostanox NOW (manufacturer Clariant SE) having the following general structure:

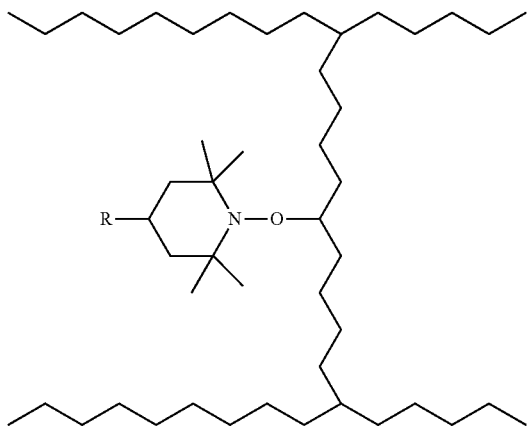

Suitable dispersion agents are, for example:

polyacrylates, for example, copolymers having long-chain side groups, polyacrylate block copolymers, alkylamides: for example, N,N'-1,2-ethanediylbisoctadecanamide sorbitan esters, for example, monostearyl sorbitan ester, titanates and zirconates, reactive copolymers with functional groups, for example, polypropylene-co-acrylic acid, polypropylene-co-maleic anhydride, polyethylene-co-glycidyl methacrylate, polystyrene-alt-maleic anhydride-polysiloxanes: for example, dimethylsilanediol-ethylene oxide copolymer, polyphenylsiloxane copolymer, amphiphilic copolymers: for example, polyethylene-block-polyethylene oxide, dendrimers, for example, hydroxyl-containing dendrimers of the following structures:

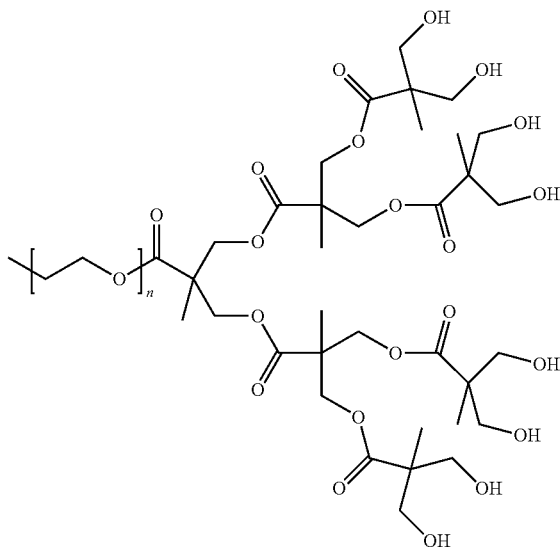

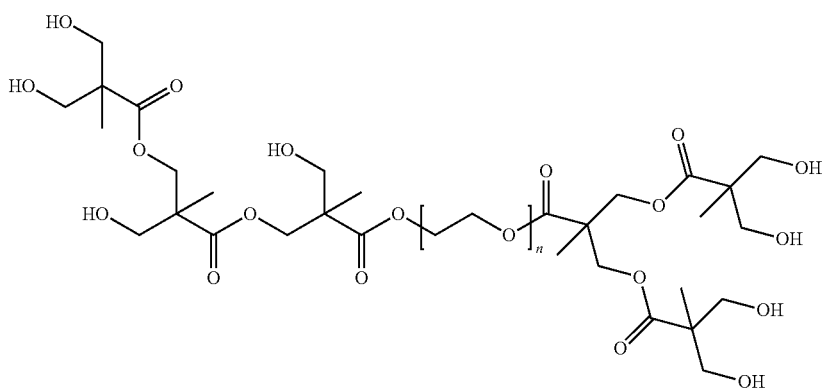

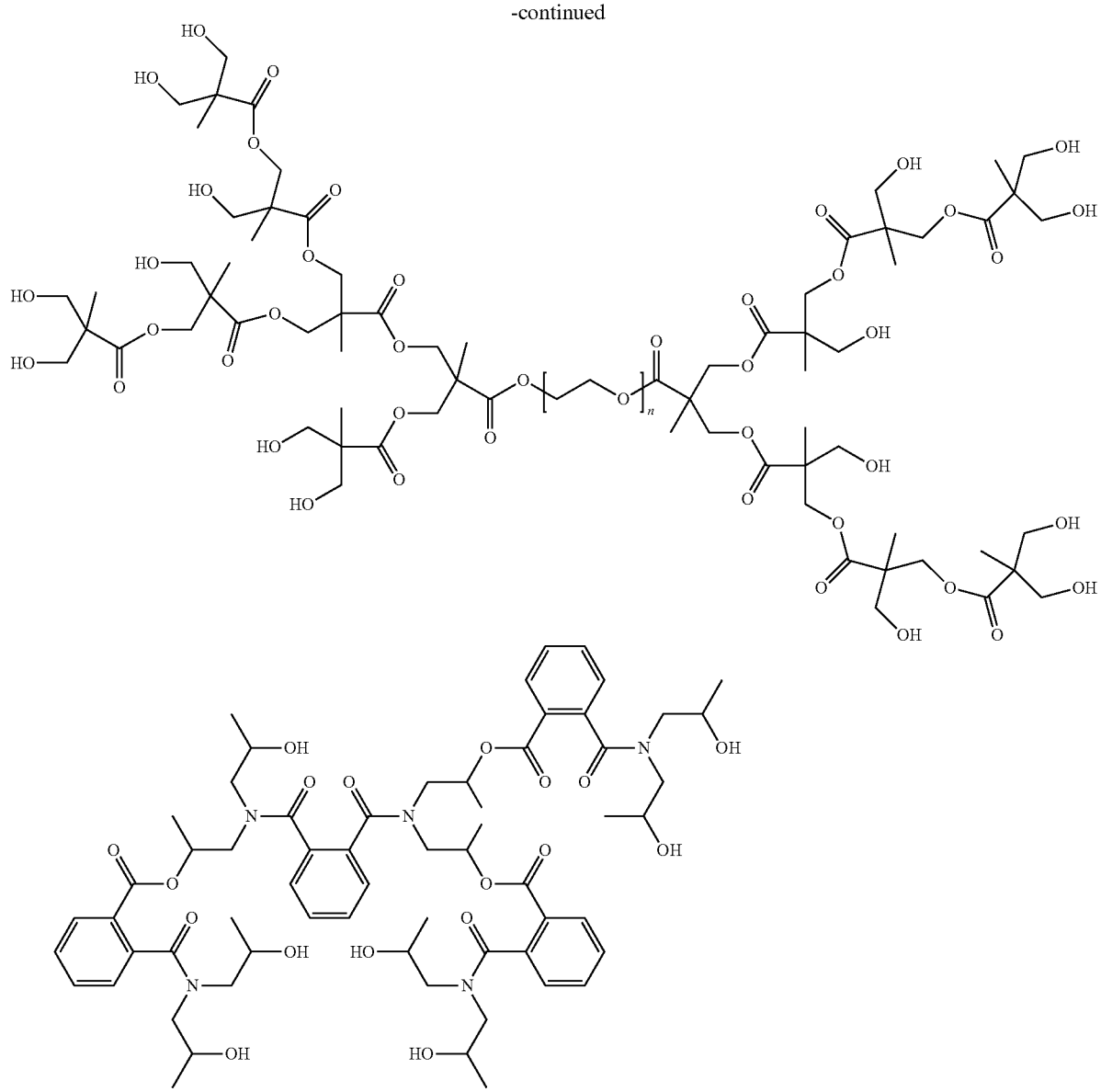

Suitable costabilizers are furthermore polyols, in particular alditols or cyclitols. Polyols are, for example, pentaerythritol, dipentaerythritol, tripentaerythritol, short-chain polyether polyols or short-chain polyester polyols, and hyperbranched polymers/oligomers or dendrimers having alcohol groups, for example The at least one alditol is preferably selected from the group consisting of threitol, erythritol, galactitol, mannitol, ribitol, sorbitol, xylitol, arabitol, isomalt, lactitol, maltitol, altritol, iditol, maltotritol and hydrogenated oligo- and polysaccharides having polyol end groups and mixtures thereof. The at least one preferred alditol is particularly preferably selected from the group consisting of erythritol, mannitol, isomaltol, maltitol, and mixtures thereof.

Examples of further suitable sugar alcohols are heptitols and octitols: meso-glycero-allo-heptitol, D-glycero-D-altro-heptitol, D-glycero-D-manno-heptitol, meso-glycero-gulo-heptitol, D-glycero-D-galacto-heptitol (perseitol), D-glycero-D-gluco-heptitol, L-glycero-D-gluco heptitol, D-erythro-L-galacto-octitol, D-threo-L-galacto-octitol.

In particular, the at least one cyclitol may be selected from the group consisting of inositol (myo, scyllo-, D-chiro-, L-chiro-, muco-, neo-, allo-, epi- and cis-inositol), 1,2,3,4-tetrahydroxycyclohexane, 1,2,3,4,5-pentahydroxycyclohexane, quercitol, viscumitol, bornesitol, conduritol, ononitol, pinitol, pinpollitol, quebrachitol, ciceritol, quinic acid, shikimic acid and valienol; in this case myo-inositol is preferred.

Suitable nucleating agents are, for example, talc, alkali or alkaline earth salts of monofunctional and polyfunctional carboxylic acids such as benzoic acid, succinic acid, adipic acid, for example, sodium benzoate, zinc glycerolate, aluminum hydroxy-bis(4-tert-butyl)benzoate, benzylidene sorbitols such as 1.3:2.4-bis(benzylidene)sorbitol or 1,3:2,4-bis(4-methylbenzylidene)sorbitol, 2,2'-methylene-bis-(4,6-di-tert-butylphenyl)phosphate, and trisamides and diamides such as trimesic acid tri-cyclohexylami, trimesic acid tri(4-methylcyclohexylamide), trimesic acid tri(tert-butylamide), N,N',N"-1,3,5-benzenetriyltris (2,2-dimethyl-propanamide) or 2,6-naphthalenedicarboxylic acid dicyclohexylamide.

Suitable antinucleation agents are azine dyes such as nigrosin.

Suitable flame retardant agents are, for example:
a) Inorganic flame retardant agents such as Al(OH)$_3$, Mg(OH)$_2$, AlO(OH), MgCO$_3$, sheet silicates such as montmorillonite or sepiolite, unmodified or organically modified double salts such as Mg—Al silicates, POSS (polyhedral oligomeric silsesquioxanes) compounds, huntite hydromagnesite or halloysite and Sb$_2$O$_3$, Sb$_2$O$_5$, MoO$_3$, zinc stannate, zinc hydroxystannate,
b) nitrogen-containing flame retardants, such as melamine, melem, melam, melon, melamine derivatives, melamine condensation products or melamine salts, benzoguanamine, polyisocyanurates, allantoin, phosphacenes, in particular melamine cyanurate, melamine phosphate, dimelamine phosphate, melamine pyrophosphate, melamine polyphosphate, melamine metal phosphates such as melamine aluminum phosphate, melamine zinc phosphate, melamine magnesium phosphate, and the corresponding pyrophosphates and polyphosphates, poly-[2,4-(piperazin-1,4-yl)-6-(morpholin-4-yl)-1,3,5-triazine], ammonium polyphosphate, melamine borate, melamine hydrobromide,
c) radical formers such as alkoxyamines, hydroxylamine esters, azo compounds, dicumyl or polycumyl, hydroxyimides and their derivatives such as hydroxyimide esters or hydroxyimide ethers
d) flame retardant agents containing phosphorus such as red phosphorus, phosphates such as resorcin diphosphite, bisphenol A diphosphate, and their oligomers, triphenylphosphate, ethylene diamine diphosphate, phosphinates such as salts of the hypophosphorous acid and their derivatives such as alkylphosphinate salts, for example, diethylphosphinate aluminum or diethylphosphinate zinc or aluminum phosphinate, aluminum phosphite, aluminum phosphonate, phosphonate esters, oligomer and polymer derivatives of the methane phosphonic acid, 9,10-dihydro-9-oxa-10-phosphorylphenanthrene-10-oxide (DOPO) and their substituted compounds,
e) halogenated flameproofing agents based on chlorine and bromine such as polybrominated diphenyl oxides such as decabromodiphenyloxide, tris(3-bromo-2,2-bis(bromomethyl)propyl-phosphate, tris(tribromoneopentyl)phosphate, tetrabromophthalic acid, 1,2-bis(tribromophenoxy)ethane, hexabromocyclododecane, brominated diphenylethane, tris-(2,3-dibrompropyl) isocyanurate, ethylene-bis-(tetrabromophthalimide), tetrabromo-bisphenol A, brominated polystyrene, brominated polybutadiene or polystyrene brominated polybutadiene copolymers, brominated polyphenylene ether, brominated epoxy resin, polypentabromobenzylacrylate, optionally in combination with Sb$_2$O$_3$ and/or Sb$_2$O$_5$,
f) borates such as zinc borate or calcium borate, optionally on a carrier material such as silica
g) sulfurous compounds, such as elemental sulfur, disulfides and polysulfides, thiuram sulfide, dithiocarbamates, mercaptobenzothiazole and sulfene amides,
h) anti-drip agents, such as polytetrafluoroethylene,
i) silicon-containing compounds, such as polyphenyl siloxanes,
j) carbon modifications such as carbon nanotubes (CNT) or graphene,
and combinations or mixtures hereof.

Particularly suitable flame retardants are radical formers preferably selected from the group consisting of N-alkoxyamines, —CC— radical formers, radical formers having azo groups (—N═N—), radical formers having hydrazine groups (—NH—HN—), radical formers having hydrazone groups (>C═N—NH—), radical formers having azine groups (>C═NN═C<), radical formers having triazene groups (—N═NN<) or from iminoxytriazines.

The preparation of suitable azo compounds is described, for example, in M. Aubert et. al. Macromol. Sci. Eng. 2007, 292, 707-714 or in WO 2008101845, the production of hydrazones and azines in M. Aubert et al., Pol. Adv. Technol. 2011, 22, 1529-1538, the production of triazenes in W. Pawelec et al., Pol. Degr. Stab. 2012, 97, 948-954. The synthesis of iminoxytriazines is described in WO 2014/064064.

In particular, radical formers to be used are selected from the group consisting of
a) N-alkoxyamines according to the structural formula shown below

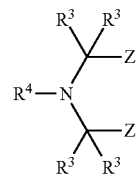

where
R$^3$ represents hydrogen or an optionally substituted alkyl, cycloalkyl, aryl, heteroaryl or acyl residue, in particular a C1 to C4 alkyl residue,
R$^4$ represents an alkoxy, aryloxy, cycloalkoxy, aralkoxy or acyloxy residue,
Z represents hydrogen or an optionally substituted alkyl, cycloalkyl, aryl, heteroaryl or acyl residue, where the two residues Z can also form a closed ring, which can be optionally substituted by ester, ether, amine, amide, carboxy- or urethane groups,
E represents an alkoxy, aryloxy, cycloalkyloxy, aralkoxy or acyloxy residue,
b) azo compounds according to the structural formulas shown below

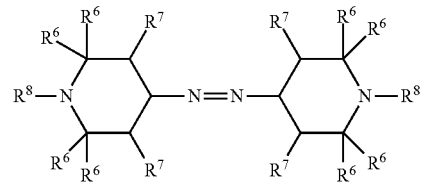

or R$^5$—N═N—R$^5$
where
R$^5$ denotes an alkyl, cycloalkyl or aryl residue,
R$^6$ is identical or different on each occurrence and denotes a linear or branched alkyl residue, $R^7$ is identical or different on each occurrence and denotes hydrogen or a linear or branched alkyl residue, and
$R^8$ is identical or different on each occurrence and denotes an alkyl, alkoxy, aryloxy, cycloalkyloxy, aralkoxy or acyloxy residue,
c) dicumyl according to the structural formula shown below

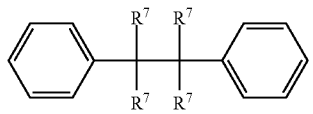

where $R^7$ has the meaning given above, is preferably methyl,
and/or polycumyl according to the structural formula shown below

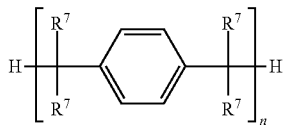

where $R^7$ has the meaning given above, is preferably methyl, and $2<n<100$.

Typical examples of the aforementioned N-alkoxyamines of the specified structure are:
1-cyclohexyloxy-2,2,6,6-tetramethyl-4-octadecylaminopiperidine; bis(1-octyloxy-2,2,6,6-tetramethylpiperidin-4-yl) sebacate; 2,4-bis[(1-cyclohexyloxy-2,2,6,6-tetramethylpiperidin-4-yl)butylamino]-6-(2-hydroxyethylamino-S-triazine; bis(1-cyclohexyloxy-2,2,6,6-tetramethylpiperidin-4-yl) adipate; 2,4-bis[(1-cyclohexyloxy-2,2,6,6-tetramethylpiperidin-4-yl) butylamino]-6-chloro-S-triazine; 1-(2-hydroxy-2-methylpropoxy)-4-hydroxy-2,2,6,6-tetramethylpiperidine; 1-(2-hydroxy-2-methylpropoxy)-4-oxo-2,2,6,6-tetramethylpiperidine; 1-(2-hydroxy-2-methylpropoxy)-4-octadecanoyloxy-2,2,6,6-tetramethylpiperidine; bis(1-(2-hydroxy-2-methylpropoxy)-2,2,6,6-tetramethylpiperidine-4-yl)sebacate; bis(1-(2-hydroxy-2-methylpropoxy)-2,2,6,6-tetramethylpiperidin-4-yl) adipate; 2,4-bis{N-[1-(2-hydroxy-2-methylpropoxy)-2,2,6,6-tetramethylpiperidin-4-yl]-N-butylamino}-6-(2-hydroxyethylamino)-S-triazine); 4-piperidinol, 2,2,6,6-tetramethyl-1-(undecyloxy)-4,4'-carbonate; the reaction product of 2,4-bis[(1-cyclohexyloxy-2,2,6,6-tetramethylpiperidin-4-yl)butylamino]-6-chloro-S-triazine with N,N'-bis(3-aminopropylethylenediamine); the oligomer compound, which is the condensation product of 4,4'-hexamethylene-bis(amino-2,2,6,6-tetramethylpiperidine) and 2,4-dichloro-6-[(1-cyclohexyloxy-2,2,6,6-tetramethyl-4-yl)butylamino]-S-triazine, closed at the ends with 2-chloro-4,6-bis(dibutylamino)-S-triazine; aliphatic hydroxylamine such as

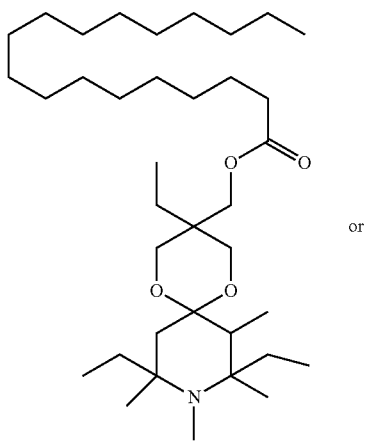

or

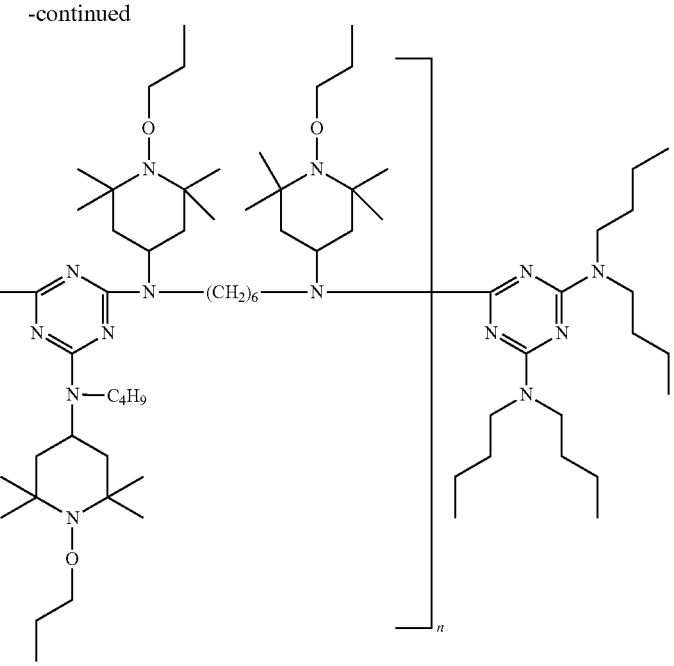

in which n=1-15, such as disteraryl hydroxylamine.

Some of the above compounds are commercial products and are traded under the following trade names: FLAMESTAB NOR 116®, TINUVIN NOR 371®, IRGATEC CR 76® from BASF SE, Hostavin NOW® from Clariant or ADK Stab LA 81® from Adeka. Dicumyl and Polycumyl are commercial products available, for example, from United Initiators.

a) Phosphorus-Containing Flame Retardants, for Example, Phosphinates of the Following Structures:

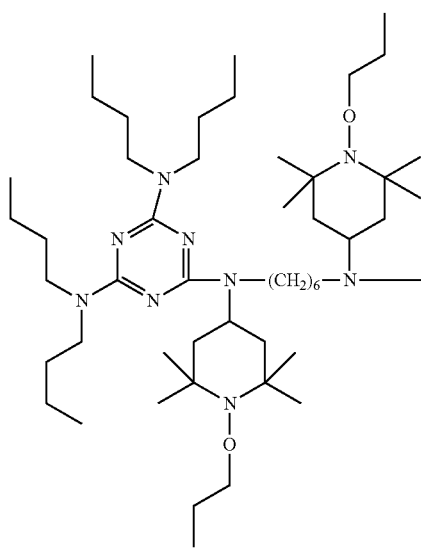

where $R_1$ and $R_2$ are preferably identical or different and are selected from linear or branched C1-C6 alkyl and/or aryl; M is selected from the group consisting of Mg, Ca, Al, Sb, Sn, Ge, Ti, Fe, Zr, Ce, Bi, Sr, Mn, Li, Na, K, Zn and/or a protonated nitrogen base, preferably calcium ions, magnesium ions, aluminum ions and/or zinc ions; and m=1-4, preferably 2 or 3; n=1-4, preferably 1 or 3; x=1-4, preferably 1 or 2. In a particularly preferred embodiment, $R_1$=alkyl, $R_2$=alkyl and M=Al or Zn.

A particularly preferred example of a phosphinate are the commercially available Exolit OP® products from Clariant SE.

Further preferred phosphorus-containing flame retardants are metal salts of hypophosphorous acid having a structure according to the formula

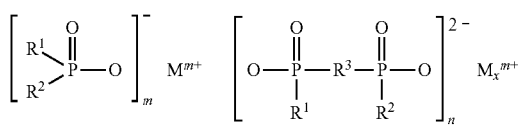

where Met is a metal selected from groups I, II, III and IV of the periodic table of the elements, and n is a number from 1 to 4 which corresponds to the charge of the corresponding metal ion Met. $Met^{n+}$ is, for example, $Na^+$, $Ca^{2+}$, $Mg^{2+}$, $Zn^{2+}$, $Ti^{4+}$ or $Al^{3+}$, where $Ca^{2+}$, $Zn^{2+}$ and $Al^{3+}$ are particularly preferred.

Some of the above-mentioned salts of hypophosphorous acid are commercially available, for example, under the name Phoslite® from Italmatch Chemicals.

A further preferred group of phosphorus-containing flame retardants are phosphonates or phosphonic acid diaryl esters having a structure according to the following formula:

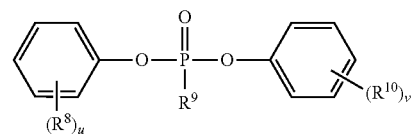

where $R_8$ and $R_{10}$=H, alkyl, preferably C1-C4, $R_9$=C1-C4 alkyl, u=1-5 and v=1-5.

Corresponding structures can also exist in the form of phosphonate oligomers, polymers and copolymers. Linear or branched phosphonate oligomers and polymers are known from the prior art. For branched phosphonate oligomers and polymers, reference is made to U.S. Pat. Nos. 2,716,101, 3,326,852, 4,328,174, 4,331,614, 4,374,971, 4,415,719, 5,216,113, 5,334,692, 3,442,854, 6,291,630 B1, U.S. Pat. No. 6,861,499 B2 and U.S. Pat. No. 7,816,486 B2. For phosphonate oligomers, reference is made to US patent applications US 2005/0020800 A1, US 2007/0219295 A1 and US 2008/0045673 A1. With regard to linear phosphonate oligomers and polymers, reference is made to US patent documents U.S. Pat. Nos. 3,946,093, 3,919,363, 6,288,210B1, 2,682,522 and 2,891,915.
Phosphonates are available, for example, under the trade name Nofia® from FRX Polymers.
A further preferred group of phosphorus-containing flame retardants are compounds based on oxaphosphorine oxide and their derivatives having, for example, the following structures:
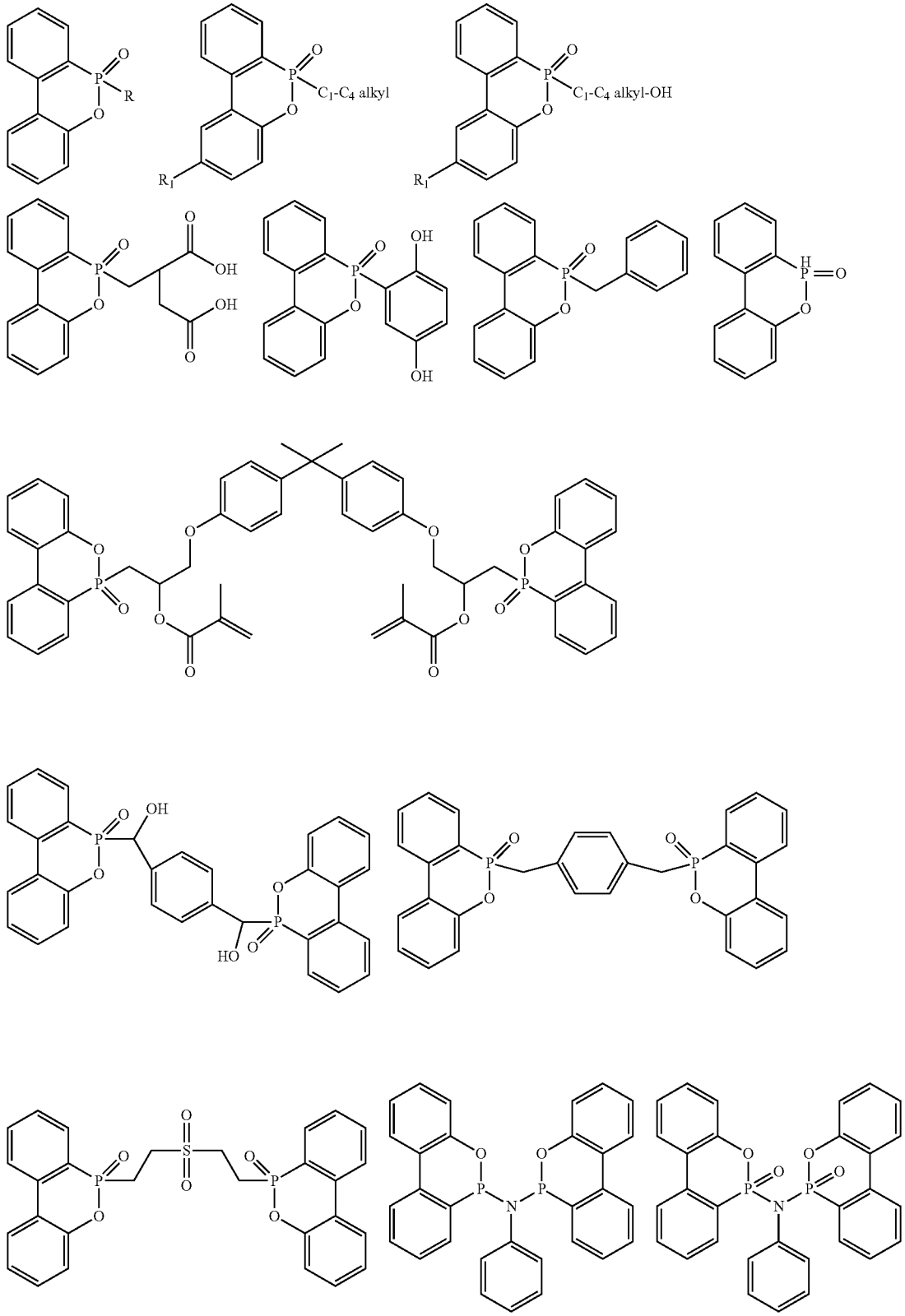

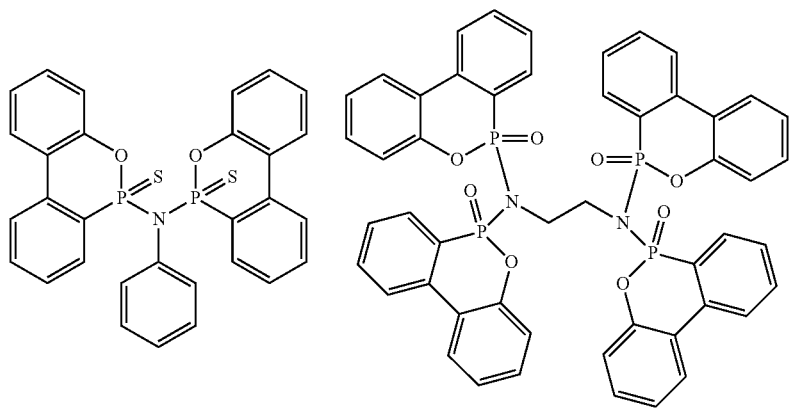
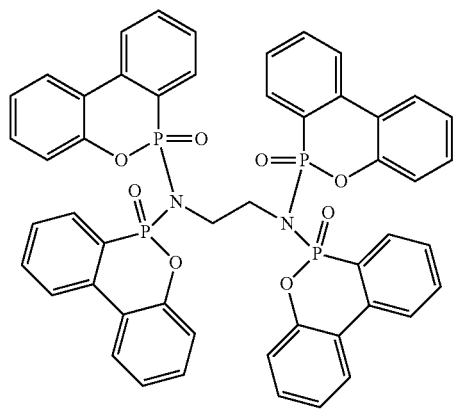
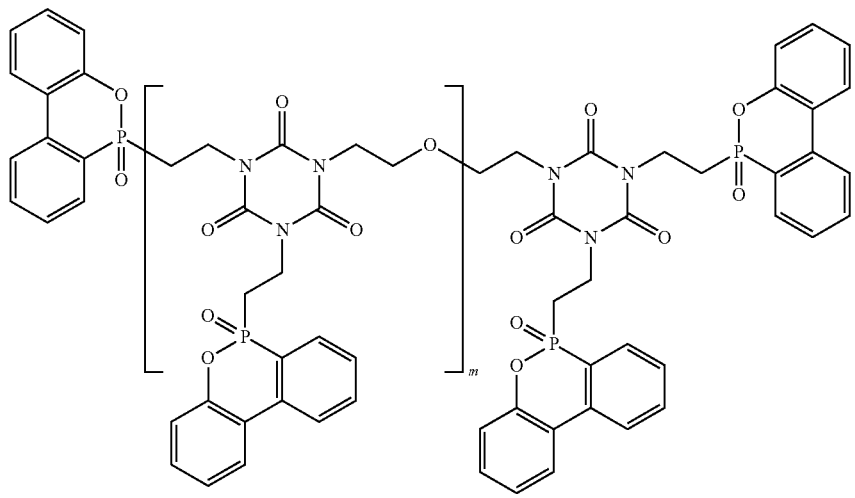
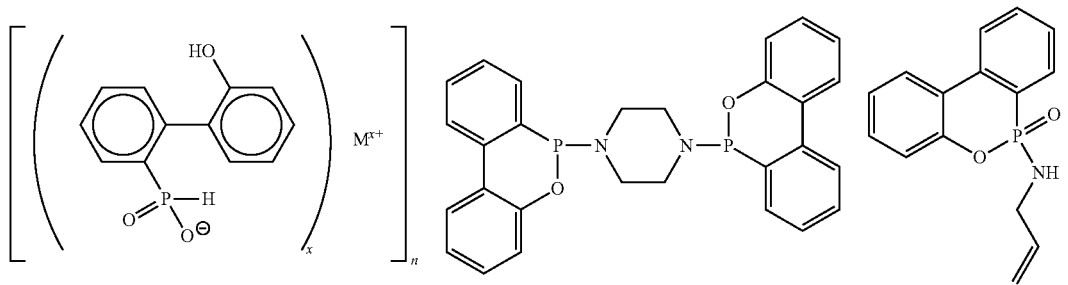

-continued
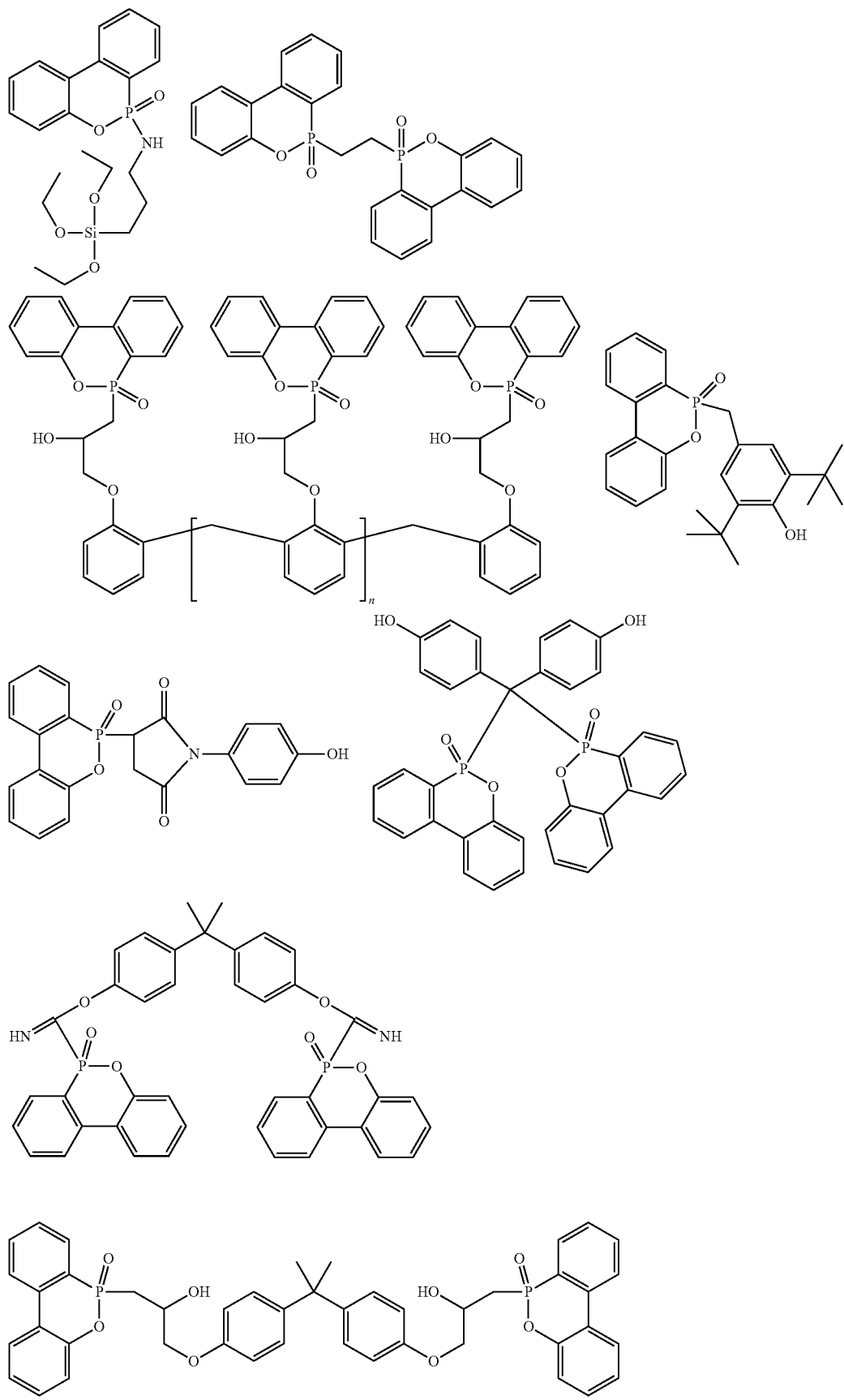

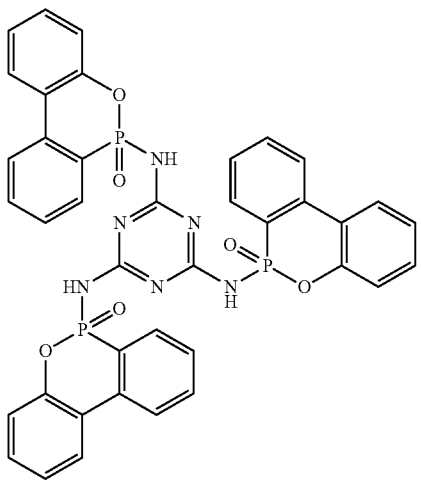
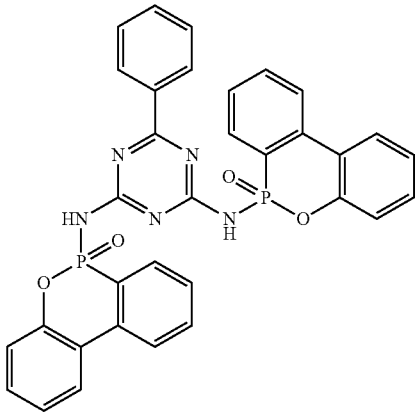

where M is a metal selected from the second, third, twelfth or thirteenth group of the periodic table of the elements, x=2 or 3, n≥10, m=0-25, R=H, halogen or an aliphatic or an aromatic residue having 1-32 C atoms and $R_1$=H, C1-C6 alkyl or phenyl.

Products based on oxophosphorine oxide are available, for example, under the trade name Ukanol® from Schill and Seilacher GmbH. Further compounds can be produced, for example, according to the patent specifications WO 2013020696, WO 2010135398, WO03070736, WO2006084488, WO 2006084489, WO2011000019, WO2013068437, WO2013072295.

Further suitable phosphorus-containing flame retardants are cyclic phosphonates having a structure according to one of the following formulas:

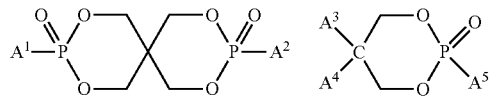

where $A^1$ and $A^2$ independently represent a substituted or unsubstituted, straight-chain or branched alkyl group having 1 to 4 carbon atoms, substituted or unsubstituted benzyl, substituted or unsubstituted phenyl, substituted or unsubstituted naphthyl and where $A^3$ and $A^4$ independently represent methyl or ethyl and $A^5$ is a straight-chain or branched alkyl group having 1 to 4 carbon atoms or a phenyl or benzyl group, each of which can have up to 3 methyl groups.

Cyclic phosphonates are, for example, commercially available from Thor GmbH under the trade name Aflammit® or can be produced in accordance with EP 2450401.

Further synergistic phosphorus-containing flame retardants are phosphacenes, in particular polymeric phosphacenes. A corresponding product is, for example, commercially available from Otsuka Chemicals under the name SPB-100.

b) Flame Retardants Containing Nitrogen

Preferred nitrogen-containing flame retardants are melamine polyphosphate, melamine cyanurate, melamine metal phosphates, poly-[2,4-(piperazin-1,4-yl)-6-(morpholin-4-yl)-1,3,5-triazine] and ammonium polyphosphate. These compounds are commercial products and are available under the trade names Melapur® from BASF SE, Budit® from Budenheim Chemische Fabrik, Exolit® from Clariant, Safire® from Huber Chemicals or MCA PPM Triazine from MCA Technologies GmbH.

c) Preferred Sulfur-Containing Flame Retardants are, for Example, the Following Compounds

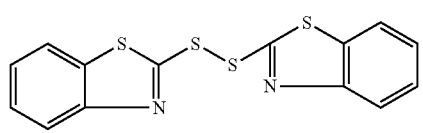
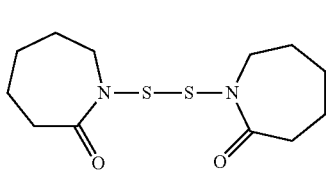
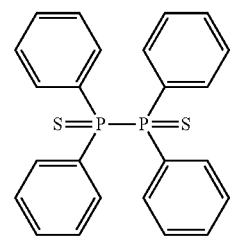

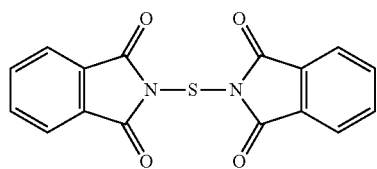
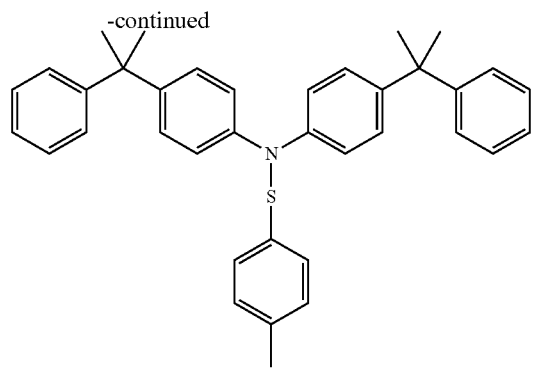
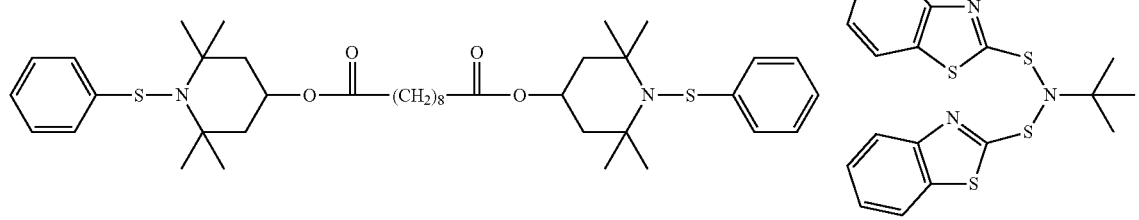
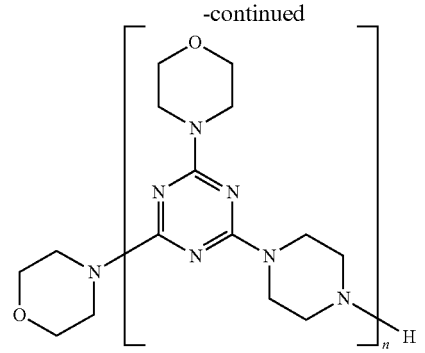
The following compounds are halogen free and are very particularly preferred flame retardant agents:
Al(OH)$_3$, Mg(OH)$_2$,
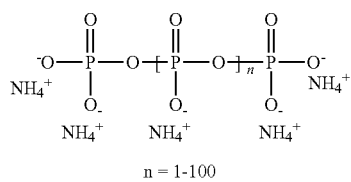
n = 1-100
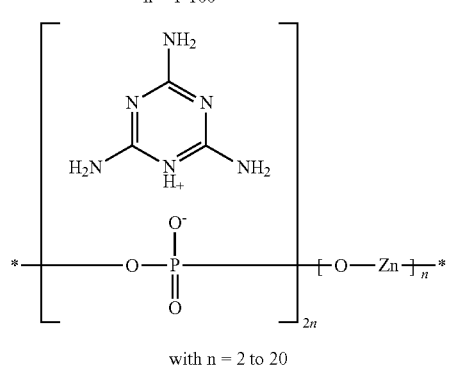
with n = 2 to 20
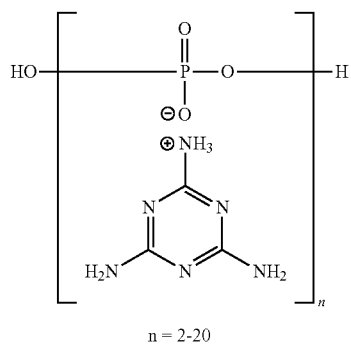
n = 2-20
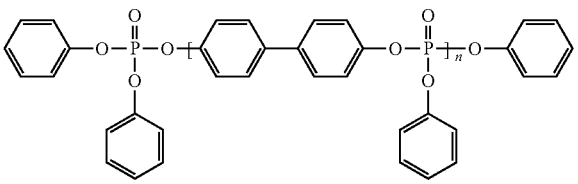
with n = 3 to 100
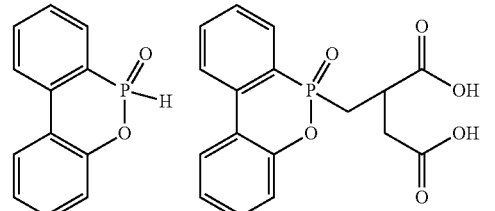
n = 1-3
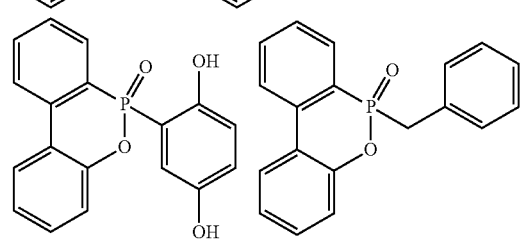

-continued

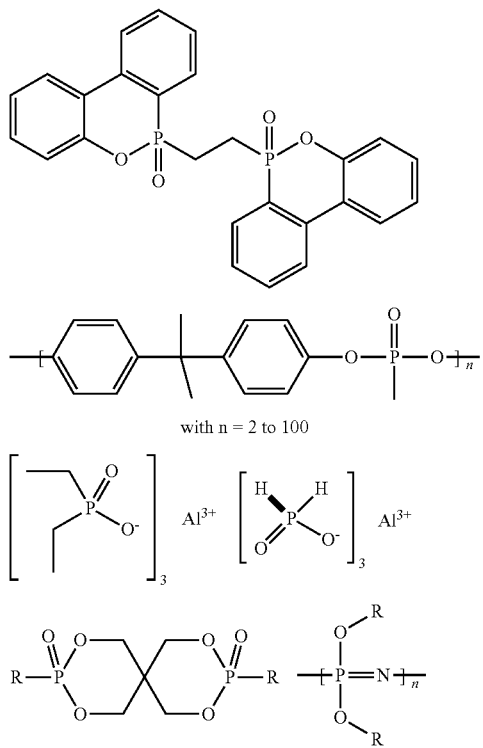

with n = 2 to 100 with R=alkyl, phenyl respectively and n=3 to 20

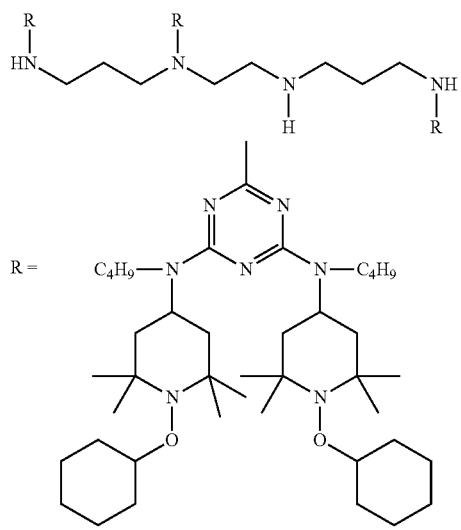

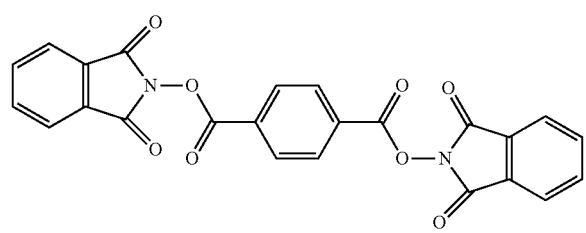

-continued

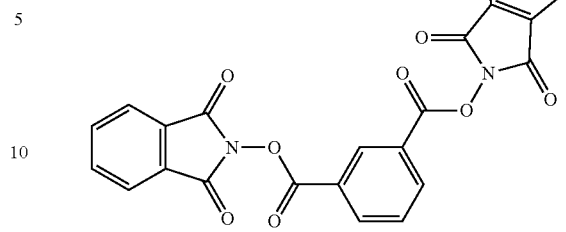

Suitable fillers and reinforcing materials are, for example, synthetic or natural materials such as calcium carbonate, silicates, glass fibers, glass spheres (solid or hollow), talc, mica, kaolin, barium sulfate, metal oxides and metal hydroxides, carbon black, graphite, carbon nanotubes, graphene, wood flour or fibers from natural products such as cellulose or synthetic fibers. Further suitable fillers are hydrotalcites or zeolites or phyllosilicates such as montmorillonite, bentonite, beidellite, mica, hectorite, saponite, vermiculite, ledikite, magadite, illite, kaolinite, wollastonite, attapulgite.

Suitable pigments can be of an inorganic or organic nature. Inorganic pigments are, for example, titanium dioxide, zinc oxide, zinc sulfide, iron oxide, ultramarine, black carbon; organic pigments are, for example, anthraquinones, anthanthrones, benzimidazolones, chinacridones, diketopyrrolopyrrols, dioxazines, inanthrones, isoindolines, azo compounds, perylenes, phthalocyanines or pyranthrones. Further suitable pigments include effect pigments on a metal basis or pearl gloss pigments on a metal oxide basis.

Suitable mold lubricants and processing aids are, for example, polyethylene waxes, polypropylene waxes, salts of fatty acids such as calcium stearate, zinc stearate, or salts of montane waxes, amide waxes such as erucic acid amide or oleic acid amides, fluoropolymers, silicones, or neoalkoxytitanates and zirconates.

Suitable optical brighteners are, for example, bis-beznzoxazoles, phenylcumarines, or bis(styryl)biphenyls and in particular optical brighteners of the formulas:

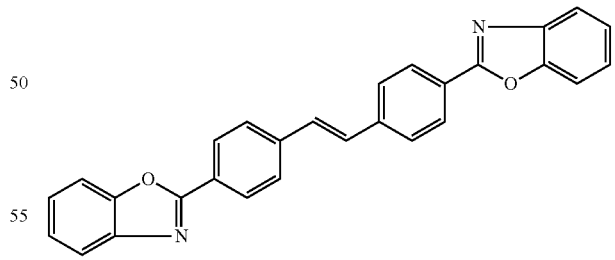

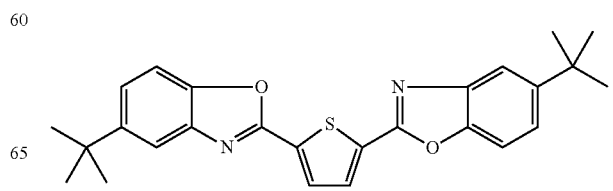

61
-continued
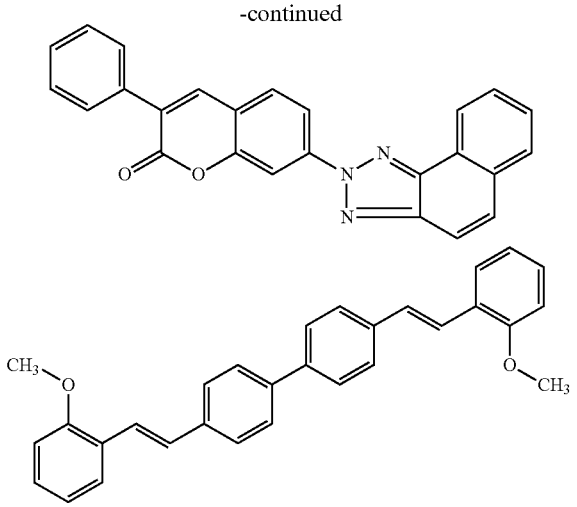
62
-continued
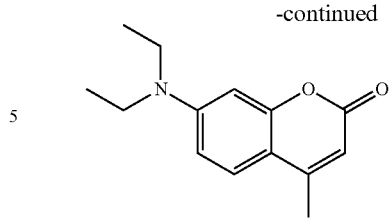
Suitable filler deactivators are, for example, polysiloxanes, polyacrylates, in particular block copolymers such as polymethacrylic acid polyalkyene oxide or polyglycidyl (meth)acrylates and their copolymers, for example, with styrene and epoxides of, for example, the following structures:
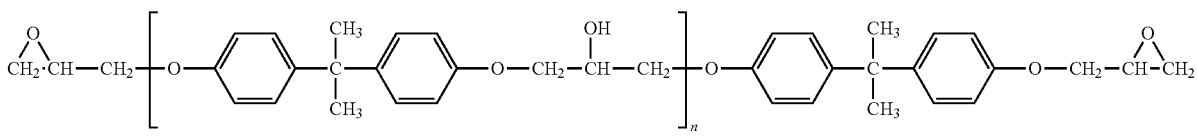
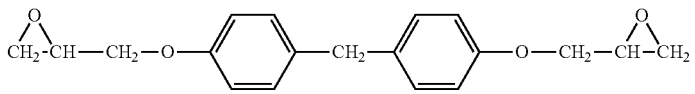
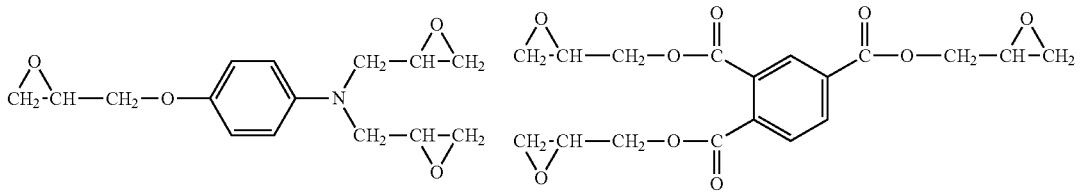
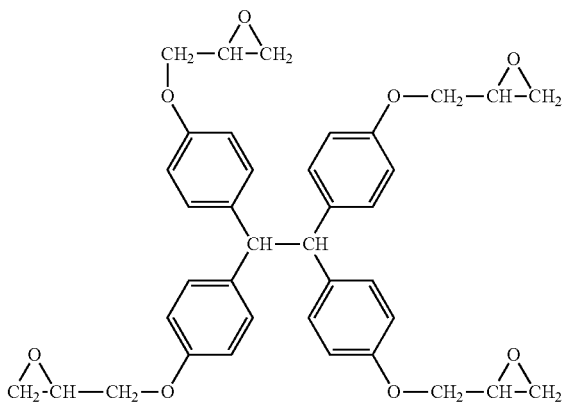
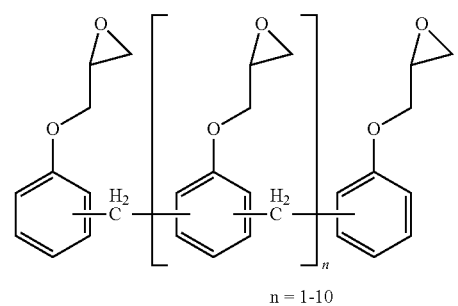
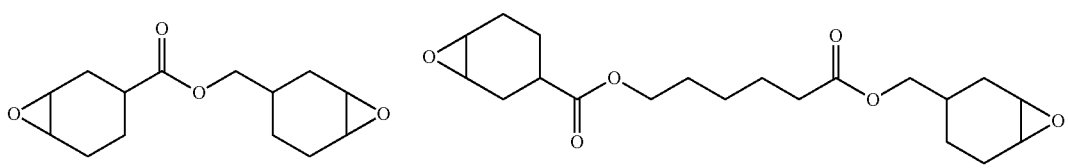

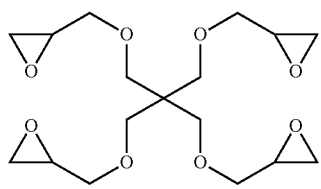

Suitable antistatic agents are, for example, ethoxylated alkylamines, fatty acid esters, alkylsulfonates, and polymers such as polyetheramides.

Suitable antiozonants are the above-mentioned amines such as N,N'-di-isopropyl-p-phenylenediamine, N,N'-di-sec-butyl-p-phenylenediamine, N,N'-bis(1,4-dimethylpentyl)-p-phenylenediamine, N,N'-dicyclohexyl-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine Suitable rheology modifiers, for example, for the preparation of controlled rheology polypropylene (CR-PP), are, for example, peroxides, alkoxyaminoesters, oxymide sulfonic acid esters, and in particular the following structures:

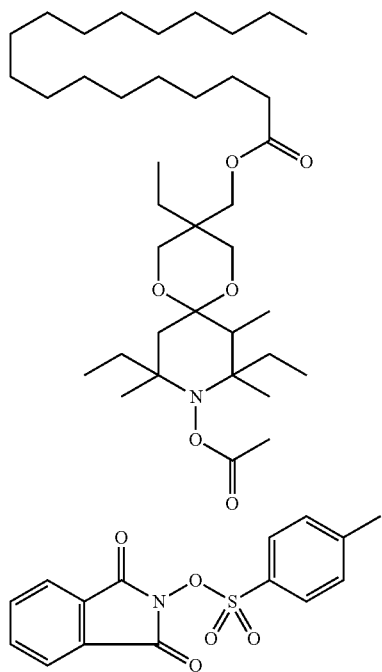

Suitable additives for increasing the molecular weight of polycondensation polymers (chain extenders) are diepoxides, bis-oxazolines, bis-oxazolones, bis-oxazines, diisocyanates, dianhydrides, bis-acyl lactams, bis-maleimides, dicyanates, carbodiimides. Further suitable chain extenders are polymeric compounds such as polystyrene-polyacrylate-polyglycidyl(meth)acrylate copolymers, polystyrene-maleic anhydride copolymers and polyethylene-maleic anhydride copolymers.

Suitable additives to increase the electrical conductivity are, for example, the mentioned static inhibitors, black carbon, and carbon compounds such as carbon nanotubes and graphene, metal powders such as copper powder, and conductive polymers such as polypyrroles, polyanilines, and polythiopenes. Suitable additives to increase thermal conductivity are, for example, aluminum nitrides and boron nitrides.

Suitable infrared-active additives are, for example, aluminum silicates or dyestuffs such as phthalocyanines or anthraquinones.

Suitable demolding agents are, for example, silicones, soaps, and waxes, such as montan waxes.

Suitable impact modifiers are, for example, ethylene copolymers with acrylates, methacrylates and/or ethylenically unsaturated carboxylic acids, which can be wholly or partially neutralized with zinc, for example, or copolymers of ethylene, propylene and dienes, and core-shell particles, for example, of polybutyl acrylate and polymethyl methacrylate.

Compatibilizers are used, for example, in thermodynamically immiscible blends or in recycled material mixtures and contain structural elements of the respective blend components that are mixed. Suitable compatibilizers for polyolefin mixtures are, for example, olefin block copolymers consisting of ethylene, propylene and alpha-olefins such as, for example, 1-octene. Other compatibilizers, in particular for compatibilizing polar, such as PET or polyamides and non-polar, such as PP or PE polymers are, for example, polypropylene-g-maleic anhydride, polyethylene-g-maleic anhydride, polypropylene-g-acrylic acid, polyethylene-g-acrylic acid, poly(ethylene-co-maleic anhydride), SBS-g-maleic anhydride or SEBS-g-maleic anhydride.

Suitable crosslinking agents are, for example, peroxides such as dialkyl peroxides, alkyl aryl peroxides, peroxyesters, peroxycarbonates, diacylproxides, peroxyketals, silanes such as vinyltrimethoxysilane, vinyltriethoxysilane, vinyltriacetoxysilane, vinyltris(2-methoxyethoxy)silane, 3-methacryloyloxypropyltrimethoxysilane, vinyldimethoxymethylsilane, or ethylene-vinylsilane copolymers.

Suitable prodegradants are additives that specifically accelerate or control the degradation of a polymer in the environment. Examples are transition metal fatty acid esters, for example, of manganese or iron, which accelerate oxidative and/or photooxidative degradation, for example, of polyolefins, or enzymes which induce hydrolytic degradation, for example, of aliphatic polyesters.

Suitable chemical blowing agents are, for example, azo compounds such as azodicarboxylic acid diamide, sulfonyl semicarbazides such as p-toluenesulfonyl semicarbazide, tetrazoles such as 5-phenyl tetrazole, hydrazides such as p-toluenesulfonyl hydrazide, 4,4'-oxibis(benzenesulfonyl) hydrazide, N-nitroso compounds such as N,N'-dinitrosopentamethylene tetramine or carbonates such as sodium hydrogen carbonate or zinc carbonate.

Suitable slip agents are, for example, amide waxes such as erucic acid amide or oleic acid amide.

Suitable antiblocking agents are, for example, silica, talc or zeolites.

Suitable anti-fogging additives are, for example, ethoxylated sorbitan esters, ethoxylated fatty acid alcohols or ethoxylated alkylamine esters.

Suitable biocides are, for example, quaternary ammonium salts or silver salts, colloidal silver or silver complexes or natural product derivatives such as chitosan Suitable aldehyde scavengers are amines, hydroxylamines, polyvinyl alcohol, zeolites or cyclodextrins, suitable formaldehyde scavengers are melamine derivatives such as benzoguanamine or urea derivatives such as allantoin.

Suitable odor-binding or odor-preventing substances are silicates such as calcium silicate, zeolites or salts of hydroxy fatty acids such as zinc riceneolate.

Suitable marking agents are, for example, fluorescent dyes or rare earths.

The present invention further relates to a method for stabilizing plastic materials against oxidative, thermal and/or actinic degradation, in which at least one phenolically substituted sugar derivative, the sugar derivative having a body derived from a sugar, and at least one substituent according to general formula I

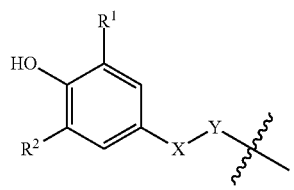

Formula I where $R^1$ and $R^2$ are identical or different on each occurrence and are selected from the group consisting of hydrogen and linear or branched alkyl radicals, with the proviso that at least one residue $R^1$ or $R^2$ is not hydrogen, X an alkylene group having 1 to 18 carbon atoms or a chemical bond, Y a grouping selected from the group consisting of the following groupings

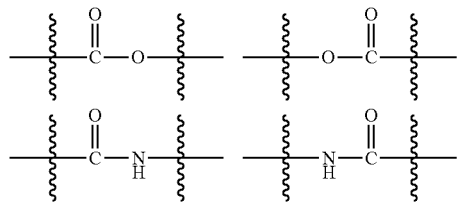

where the grouping X is bound to the terminus shown on the left of the groupings Y shown above, and where the body of the phenolically substituted sugar derivative derived from a sugar has at least 3 unsubstituted hydroxyl groups and/or the body of the phenolically substituted sugar derivative derived from a sugar has at least 4 carbon atoms and has at least 2, preferably at least 3, unsubstituted hydroxyl groups, is incorporated into a plastic material.

With regard to the phenolically substituted sugar derivative according to the general formula I, reference is made to the statements made above.

The additive according to the invention, which can be present as a powder, liquid, oil, compacted, on a carrier material, as granules, solution or flakes, is preferably mixed with the polymer to be stabilized, the polymer matrix is transferred into the melt and then cooled. Alternatively to this, it is equally possible to introduce the additive into a polymer melt in a molten state.

In the event that further constituents are added to the polymer composition, these can be added to the polymers separately, in the form of liquids, powders, granules or compacted products or together with the additive composition according to the invention as described above.

The above-described additive composition and optionally the additional additives are incorporated into the plastic material by customary processing methods, the polymer being melted and mixed with the additive composition according to the invention and the optionally further additives, preferably using a mixer, kneader and extruder. Extruders, such as single-screw extruders, twin-screw extruders, planetary gear extruders, ring extruders, co-kneaders, are preferred processing machines and are preferably equipped with a vacuum degassing means. The processing can take place here under air or, optionally, under inert gas conditions.

Furthermore, the additive compositions according to the invention can be produced and incorporated in the form of so-called masterbatches or concentrates which contain, for example, 10-90% of the compositions according to the invention in a polymer.

The invention further relates to a molding compound or a molded part, producible from a plastic composition according to the invention as described above, in particular in the form of injection molded parts, foils, films, paints, coatings, foams, fibers, cables, pipes, profiles, hollow bodies, tapes, membranes, for example, geomembranes, lubricants, colorants and/or adhesives that are produced via extrusion, injection molding, blow molding, calendering, pressing processes, spinning processes and/or rotomoulding, for example, for the electrical industry, for the construction industry, for the transport industry, for medical applications, for household and electrical appliances, for vehicle parts, for consumer articles, for packaging, for furniture and/or for textiles. A further area of application are paints, colorants and coatings, and fats and oils.

If the organic materials are oils and fats, these can be based on mineral oils, vegetable fats or animal fats or oils, fats or waxes based on, for example, synthetic esters. Vegetable oils and fats are, for example, palm oil, olive oil, rapeseed oil, linseed oil, soybean oil, sunflower oil, castor oil; animal fats are, for example, fish oils or beef tallow.

The compounds according to the invention can also be used as stabilizers for lubricants, hydraulic oils, motor oils, turbine oils, gear oils, metal working fluids or as lubricating greases. These mineral or synthetic lubricants are mainly based on hydrocarbons.

Furthermore, the antioxidants according to the invention can be used to stabilize monomers in order to optionally prevent premature polymerization or oxidation, for example, for styrene or acrylates or for the stabilization of polyols in polyurethane synthesis.

The present invention also relates to a stabilizer composition for stabilizing plastic materials against oxidative, thermal and/or actinic degradation, consisting of at least one phenolically substituted sugar derivative, the sugar derivative having a body derived from a sugar, and at least one substituent according to general formula I.

Formula I

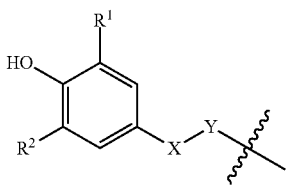

where R¹ and R² are identical or different on each occurrence and are selected from the group consisting of hydrogen and linear or branched alkyl radicals, with the proviso that at least one residue R¹ or R² is not hydrogen, X an alkylene group having 1 to 18 carbon atoms or a chemical bond, Y a grouping selected from the group consisting of the following groupings

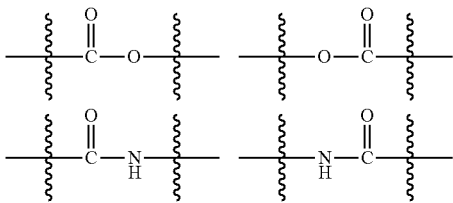

where the grouping X is bound to the terminus shown on the left of the groupings Y shown above, and where the body of the phenolic substituted sugar derivative derived from a sugar has at least 3 unsubstituted hydroxyl groups and/or the body of the phenolic substituted sugar derivative derived from a sugar has at least 4 carbon atoms and has at least 2, preferably at least 3, unsubstituted hydroxyl groups, and at least one primary antioxidant and/or at least one secondary antioxidant.

Finally, the present invention relates to a phenolic substituted sugar derivative, the sugar derivative having a body derived from a sugar, and at least one substituent according to general formula I Formula I

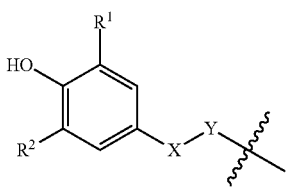

where R¹ and R² are identical or different on each occurrence and are selected from the group consisting of hydrogen and linear or branched alkyl radicals, with the proviso that at least one residue R¹ or R² is not hydrogen, X an alkylene group having 1 to 18 carbon atoms or a chemical bond, Y a grouping selected from the group consisting of the following groupings

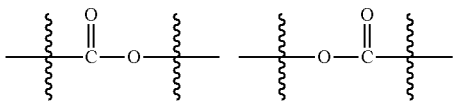

-continued

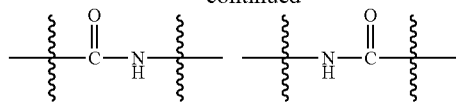

where the grouping X is bound to the terminus shown on the left of the groupings Y shown above, and where the body of the phenolically substituted sugar derivative derived from a sugar has at least 3 unsubstituted hydroxyl groups and/or the body of the phenolically substituted sugar derivative derived from a sugar has at least 4 carbon atoms and has at least 2, preferably at least 3, unsubstituted hydroxyl groups.

With regard to the special and preferred embodiment of the phenolically substituted sugar derivative according to the invention, reference is made to the statements made above.

The present invention is described in more detail with reference to the following exemplary embodiment, without restricting the invention thereto.

EXAMPLE ACCORDING TO THE INVENTION

To test the effect of the stabilizers according to the invention, a commercial polypropylene (Moplen HP 500N, Lyondell Basell Industries) was homogenized in a powder-powder mixture with the stabilizers indicated and circulated in a twin-screw microextruder (MC 5, manufacturer DSM) for 30 minutes at 200° C. and 90 revolutions per minute, and the decrease in force was recorded. The force is a direct measure for the molecular weight of polypropylene: the smaller the decrease, the higher the stabilization effect.

The addition of 0.1 to 0.3% of a 3-(3,5-di-tert-butyl-4-hydroxyphenyl)propionic acid ester of mannitol (>90% monosubstituted), produced by transesterification of the 3-(3,5-di-tert-butyl-4-hydroxyphenyl)propionic acid methyl ester with mannitol leads to increased processing stabilization, that is, to a higher residual strength, compared to a polypropylene without additives or to a polypropylene that contains only mannitol. A further improvement in processing stability is achieved by adding 0.1% primary antioxidant (pentaerythritol-tetrakis[3-(3,5-di-tert-butyl-4-hydroxyphenyl)propionate) or 0.1% secondary antioxidant (tris(2,4-di-tert-butylphenyl)phosphite) to 0.2% of the 3-(3,5-di-tert-butyl-4-hydroxyphenyl)propionic acid ester.

In an analogous manner, the monofunctional derivatives having more than 80% monosubstitution are obtained by transesterification of methyl 3-(3,5-di-tert-butyl-4-hydroxyphenyl)propionic acid methyl ester with erythritol, myo-inositol and sorbitol.

The 3-(3,5-di-tert-butyl-4-hydroxyphenyl)propionic acid ester of mannitol (>90% monosubstituted) was further added to the following polymers at the specified processing temperatures in a concentration of 0.2%, processed for 30 minutes and the force curve determined:

HDPE, 230° C.
LLDPE, 200° C.
Polystyrene, 230° C.
ABS, 230° C.
PC/ABS, 250° C.
PET, 260° C. (myo-inositol derivative)
PA-6.6, 260° C. (myo-inositol derivative)
Polyolefin recyclate, consisting of a PE/PP mixture, 210° C.

In all cases, a stabilizing effect with the additives according to the invention, in contrast to the starting polymers

What is claimed is:

1. A method of stabilizing an organic material comprising incorporating into the organic material at least one phenolically substituted sugar derivative, the phenolically substituted sugar derivative selected from the group consisting of the following molecules

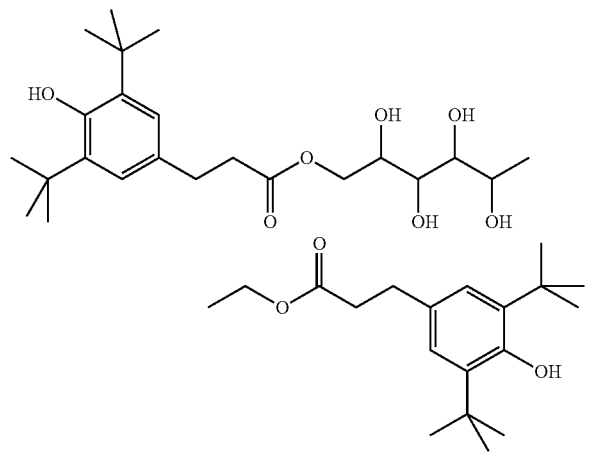

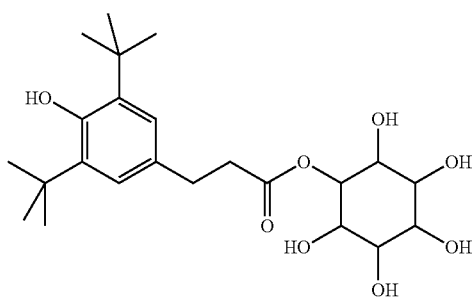

and mixtures thereof,

[having a body derived from sugar, and at least one substituted according to general formula I

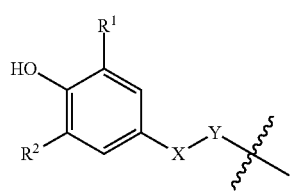

Formula I wherein

R$^1$ and R$^2$ are identical or different on each occurrence and are selected from the group consisting of hydrogen and linear or branched alkyl radicals, with the proviso that at least one residue R$^1$ or R$^2$ is not hydrogen, X is an alkylene group having 1 to 18 carbon atoms or a chemical bond, Y is a grouping selected from the following groupings

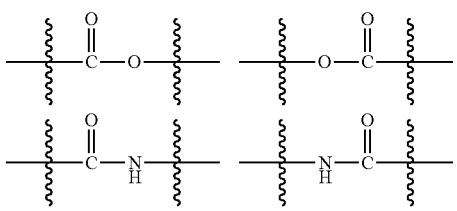

wherein X is bound to the terminus shown on the left of Y, and where the body of the phenolically substituted sugar derivative derived from a sugar has at least 3 unsubstituted hydroxyl groups and/or the base body of the phenolically substituted sugar derivative derived from a sugar has at least 4 carbon atoms and has at least 2 unsubstituted hydroxy groups, and is at least one alditol, a cyclitol, a sugar acid or an amino sugar having at least 4 carbon atoms, and]

wherein the organic material is a polymer selected from the group consisting of a) polymer made from olefins or diolefins, polyalkylene-carbon monoxide copolymers, and corresponding copolymers in the form of random or block structures ethylene-vinyl acetate (EVA), ethylene-acrylic esters, and corresponding graft polymers, b) polystyrene, polymethylstyrene, polyvinylnaphthalene, styrene-butadiene (SB), styrene-butadiene-styrene (SBS), styrene-ethylene-butylene-styrene (SEBS), styrene-ethylene-propylene-styrene, styrene isoprene, styrene-isoprene-styrene (SIS), styrene-butadiene-acrylonitrile (ABS), styrene-acrylonitrile-acrylate (ASA), styrene-ethylene, styrene-maleic anhydride polymers including corresponding graft polymers, and graft copolymers made from methyl methacrylate, styrene-butadiene and ABS (MABS), c) polymers of unsaturated esters, polyacrylonitrile, polyacrylamide, and corresponding copolymers, d) polymers made from unsaturated alcohols and derivatives, e) polyacetals and corresponding copolymers, f) polyphenylene oxides and blends of these with polystyrene or polyamides g) polymers of cyclic ethers, h) polyurethanes made from hydroxy-terminated polyethers or polyesters and aromatic or aliphatic isocyanates, i) polyamides j) polyimides, polyamide-imides, polyether imides, polyester imides, poly(ether)ketones, polysulfones, polyether sulfones, polyaryl sulfones, polyphenylene sulfide, polybenzimidazoles, and polyhydantoins, k) polyesters made from aliphatic or aromatic dicarboxylic acids and diols or from hydroxycarboxylic acids, l) polycarbonates, polyester carbonates and blends thereof, m) cellulose derivatives, n) and mixtures, combinations, or blends of two or more of the above-named polymers, wherein said polymer or polymers can be fresh or recycled.

2. The method according to claim 1, wherein the at least one phenolically substituted sugar derivative is incorporated in a total amount of 0.01 to 10% by weight based on the organic material.

3. The method according to claim 1, wherein the at least one phenolic substituted sugar derivative is incorporated in combination with a primary and/or a secondary antioxidant that differs from the at least one phenolic substituted sugar derivative.

4. The method according to claim 3, wherein the at least one primary and/or secondary antioxidant is incorporated in a total amount, based on the total amount of the at least one phenolically substituted sugar derivative from 0.01 to 5 parts by weight.

5. The method according to claim 3, wherein, based on 91 to 99.94 parts by weight of the plastic material
   (A) 0.02 to 3 parts by weight of the at least one phenolically substituted sugar derivative, and
   (B) 0.04 to 6 parts by weight of the at least one primary antioxidant and/or of the at least one secondary antioxidant are incorporated.

* * * * *